US009588216B2

(12) United States Patent
Do et al.

(10) Patent No.: US 9,588,216 B2
(45) Date of Patent: Mar. 7, 2017

(54) METHOD AND APPARATUS FOR DELIVERING ASSISTANCE DATA FROM A SERVER TO A DEVICE IDENTIFYING VIRTUAL ACCESS POINTS

(71) Applicant: QUALCOMM Incorporated, San Diego, CA (US)

(72) Inventors: Ju-yong Do, Palo Alto, CA (US); Gengsheng Zhang, Cupertino, CA (US); Lionel Jacques Garin, Palo Alto, CA (US); Sai Pradeep Venkatraman, Santa Clara, CA (US); Weiyi Liu, Sunnyvale, CA (US); Sundar Raman, Fremont, CA (US)

(73) Assignee: QUALCOMM Incorporated, San Diego, CA (US)

( * ) Notice: Subject to any disclaimer, the term of this patent is extended or adjusted under 35 U.S.C. 154(b) by 72 days.

(21) Appl. No.: 14/537,744

(22) Filed: Nov. 10, 2014

(65) Prior Publication Data
US 2015/0133154 A1    May 14, 2015

Related U.S. Application Data

(60) Provisional application No. 61/903,012, filed on Nov. 12, 2013.

(51) Int. Cl.
*H04W 24/00* (2009.01)
*G01S 5/02* (2010.01)
*H04W 64/00* (2009.01)

(52) U.S. Cl.
CPC .......... *G01S 5/0252* (2013.01); *G01S 5/0236* (2013.01); *H04W 64/00* (2013.01)

(58) Field of Classification Search
CPC ..... G01S 5/0252; G01S 5/0236; H04W 64/00
(Continued)

(56) References Cited

U.S. PATENT DOCUMENTS 6,259,898 B1 * 7/2001 Lewis ............... H04W 92/02
                                                                 370/338
7,509,131 B2    3/2009 Krumm et al.
(Continued)

FOREIGN PATENT DOCUMENTS

WO    2013022213 A1    2/2013
WO    2014150724 A1    9/2014

OTHER PUBLICATIONS

Arsham F., et al., "A microscopic look at WiFi fingerprinting for indoor mobile phone localization in diverse environments", International Conference on Indoor Positioning and Indoor Navigation, IEEE, Oct. 28, 2013, pp. 1-10, XP032595725, DOI: 10.1109/IPIN.2013.6817920 [retrieved on May 16, 2014].
(Continued)

*Primary Examiner* — Marceau Milord
(74) *Attorney, Agent, or Firm* — Muncy, Geissler, Olds & Lowe, P.C.

(57) ABSTRACT

Methods and apparatus for processing positioning assistance data are provided. An exemplary method includes receiving, from a positioning server, virtual access point (VAP) data including a list of unique identifiers, and determining a location of a mobile device by using the VAP. The VAP data indicates that the unique identifiers included on the list identify signals originating from the same physical access point. The unique identifiers can be MAC addresses. In an example, the location determining the can include actively scanning a signal identified by a unique identifier on the list and not actively scanning a different signal identified by a different unique identifier also on the list. Not scanning the other MAC addresses that are on the access point's list and assigned to the mobile device keeps the mobile device from performing duplicative scanning that wastes time, processor cycles, and energy.

104 Claims, 12 Drawing Sheets

(58) Field of Classification Search
USPC .......................... 455/456.1, 434, 404.2, 457
See application file for complete search history.

(56) References Cited

U.S. PATENT DOCUMENTS

| | | | |
|---|---|---|---|
| 7,613,142 B2 | 11/2009 | Molteni et al. | |
| 7,633,909 B1* | 12/2009 | Jones | H04L 63/0272 370/338 |
| 8,140,094 B2 | 3/2012 | Morgan et al. | |
| 8,150,367 B1* | 4/2012 | Malladi | G01S 5/02 455/404.2 |
| 8,314,736 B2* | 11/2012 | Moshfeghi | G01S 5/0236 342/457 |
| 8,638,717 B2* | 1/2014 | Chen | H04W 36/00 370/328 |
| 8,989,101 B1 | 3/2015 | Mishra | |
| 9,241,353 B2* | 1/2016 | Do | H04W 76/02 |
| 2007/0153741 A1* | 7/2007 | Blanchette | H04L 45/66 370/331 |
| 2008/0008121 A1 | 1/2008 | Alizadeh-Shabdiz | |
| 2008/0186231 A1* | 8/2008 | Aljadeff | G01S 5/06 342/387 |
| 2010/0008337 A1 | 1/2010 | Bajko | |
| 2010/0311437 A1* | 12/2010 | Palanki | G01S 5/021 455/456.1 |
| 2012/0044862 A1* | 2/2012 | Chen | H04W 36/00 370/328 |
| 2012/0294231 A1* | 11/2012 | Finlow-Bates | H04W 48/14 370/328 |
| 2013/0028246 A1 | 1/2013 | Gonikberg | |
| 2013/0051303 A1* | 2/2013 | Huang | H04W 48/12 370/312 |
| 2013/0170432 A1* | 7/2013 | O'Brien | H04W 4/06 370/328 |
| 2013/0273938 A1 | 10/2013 | Ng et al. | |
| 2014/0133294 A1* | 5/2014 | Horn | H04W 28/0247 370/230 |
| 2014/0204903 A1* | 7/2014 | Kim | H04W 48/18 370/331 |
| 2014/0274043 A1* | 9/2014 | Das | H04W 48/20 455/434 |
| 2016/0131733 A1 | 5/2016 | Do et al. | |

OTHER PUBLICATIONS

Hossain A., et al., "Fingerprint-Based Location Estimation with Virtual Access Points", Computer Communications and Networks, 2008. ICCCN '08. Proceedings of 17th International Conference on, IEEE, Piscataway, NJ, USA, Aug. 3, 2008, pp. 1-6, XP031362210, ISBN: 979-1-4244-2389-7.
Partial International Search Report—PCT/US2014/065234—ISA/EPO—Apr. 8, 2015.
International Search Report and Written Opinion—PCT/US2014/065234—ISA/EPO—Sep. 9, 2015.
Shindo H., et al., "Virtual Access Point Allocation Method for High Density WLANs", Information Processing society of Japan—ICMU 2012, May 23, 2012, pp. 69-76, XP55210531, Singapore Retrieved from the Internet: URL:http://www.icmu.org/icmu2012/papers/FP-10.pdf [retrieved on Sep. 1, 2015].
Aboba B., "Virtual Access Points", IEEE P802.11 Wireless Lans, XX, XX, No. 802.11-03/154r1, May 22, 2003, pp. 1-13, XP002425027.
Yu-Jia Z., et al., "AP Selection for Indoor Localization Based on Neighborhood Rough Sets," Vehicular Technology conference (VTC FALL), 2012 IEEE, Sep. 3, 2012, pp. 1-5, XP032294920, DOI: 10.1109/VTCFALL.2012.6399345, ISBN: 978-1-4673-1880.

* cited by examiner

| Field | M/O | Data Type | Notes, Required Values |
|---|---|---|---|
| MAC | M | Binary (6 bytes) | AP base MAC address in 6 byte length binary |
| MAC_RANGE | M | Byte | Range of MAC addresses for this AP. For example, if it is range = 4, [0,1,2,3] are added to base MAC address. |
| SSID | O | String | AP SSID through which the Map Server is accessible. |
| TX_PWR | O | Byte | Effective transmission power in dBm. Provided only if AP uses static transmission power and does NOT use adaptive transmission power control. |
| HEATMAP | M | Binary | RSSI heatmap of this AP |

| Field | M/O | Data Type | Notes, Required Values |
|---|---|---|---|
| NUM_MAC | M | Byte | Number of MAC addresses (a.k.a, virtual APs) belonging to this physical AP. |
| MAC | M | Binary (6 bytes) | AP MAC address belong to this physical AP. This fields repeats NUM_MAC times. |
| SSID | O | String | AP SSID through which the Map Server is accessible. |
| TX_PWR | O | Byte | Effective transmission power in dBm. Provided only if AP uses static transmission power and does NOT use adaptive transmission power control |
| HEATMAP | M | Binary | RSSI heatmap of this AP |

*FIG. 3*

METHOD AND APPARATUS FOR DELIVERING ASSISTANCE DATA FROM A SERVER TO A DEVICE IDENTIFYING VIRTUAL ACCESS POINTS

CROSS-REFERENCE TO RELATED APPLICATION

This Application for Patent claims priority to U.S. Provisional Application No. 61/903,012, entitled "METHOD AND APPARATUS FOR DELIVERING ASSISTANCE DATA FROM A SERVER TO A DEVICE IDENTIFYING VIRTUAL ACCESS POINTS", filed Nov. 12, 2013, assigned to the assignee hereof, and expressly incorporated herein by reference in its entirety.

FIELD OF DISCLOSURE

This disclosure relates generally to electronics, and more specifically, but not exclusively, to methods and apparatus that process data relating to positioning assistance.

BACKGROUND

Positioning technologies revolutionize and monetize mobile device use. Indoor positioning technologies enable, for example, discovering local services, proximal "push" advertising and related content, finding people and items of interest, performing consumer analytics, delivering a digital coupon (e.g., in a mall), finding a gate at an airport, finding an item in a store, position-based digital rights management, and tracking worker safety. Indoor position technologies can be used in venues such as a shopping mall, a hotel, an airport, a college campus, and an entertainment destination.

Conventional indoor position technologies are accurate enough to determine an indoor position of a mobile device to within three to five meters. Indoor positioning technologies are this accurate because the technologies can use a combination of data from global positioning system (GPS) signals, global navigation satellite system (GLONASS) signals, WiFi signals, and sensor outputs to determine an indoor position of a mobile device. The mobile device performs very precise indoor positioning by combining and analyzing this data to estimate the mobile device's position and to perform a stochastic estimation of the mobile device's path.

Conventionally, a physical wireless access point, such as that in a WiFi network, uses multiple media access control (MAC) addresses to provide a respective multitude of services to a specific mobile device. One type of service provided is indoor positioning of the specific mobile device. To the specific mobile device, the multiple MAC addresses make the access point appear as multiple virtual access points, and each virtual access point appears to the mobile device as an independent physical access point. To support multiple service set identifications (SSIDs) per access point (AP), there can be:
1. Multiple SSIDs per Beacon, Single Beacon, Single Basic Service Set Identification (BSSID). A MAC address can serve as a BSSID.
2. Single SSIDs per Beacon, Single Beacon, Single BSSID.
3. Single SSIDs per Beacon, Multiple Beacon, Single BSSID.
4. Single SSIDs per Beacon, Single Beacon, Multiple BSSID (this is the de facto industry standard).

The first three approaches having a single BSSID are easy to handle from a positioning perspective since only a single BSSID is seen by the mobile device. However, using multiple virtual access points poses problems when performing WiFi-based indoor positioning.

Conventionally, when a mobile device performs indoor positioning, the mobile device scans each of the available MAC addresses (i.e., each of the multiple virtual access points) to obtain indoor position assistance data from each available MAC addresses. In response to the scanning of the MAC addresses, the physical wireless access point provides the same assistance data to the mobile device in response to each individual scan (i.e., multiple times). Thus, when scanning each of the MAC addresses, the mobile device duplicates effort, wastes processor time, and wastes energy. Wasting time due to duplicative scanning leads to in scanning a fewer number of physical access points, which results in lower positioning accuracy and longer times to fix a position of a mobile device.

Accordingly, there are long-felt industry needs for methods and apparatus that improve upon conventional methods and apparatus, including the improved methods and apparatus provided hereby.

SUMMARY

This summary provides a basic understanding of some aspects of the present teachings. This summary is not exhaustive in detail, and is neither intended to identify all critical features, nor intended to limit the scope of the claims.

Exemplary methods and apparatus for processing position assistance data by a mobile device are provided. An exemplary method includes receiving virtual access point (VAP) data including a list of unique identifiers from a positioning server and determining a location of the mobile device. The VAP data indicates that the unique identifiers included on the list identify signals originating from the same physical access point (AP). The mobile device uses the VAP data when determining the location. In a further example, provided is a non-transitory computer-readable medium, comprising processor-executable instructions stored thereon configured to cause a processor, such as a special-purpose processor, to execute at least a part of the method.

An exemplary mobile device includes a memory and a processor coupled to the memory. The processor is configured to receive VAP data including a list of unique identifiers from a positioning server. The processor is also configured to determine a location of the mobile device. The VAP data indicates that the unique identifiers included on the list identify signals originating from the same physical AP. The processor uses the VAP data when determining the location.

In a further example, provided is mobile device configured to process position assistance data, including means for receiving VAP data including a list of unique identifiers from a positioning server, and means for determining a location of the mobile device. The VAP data indicates that the unique identifiers included on the list identify signals originating from the same physical AP. The mobile device uses the VAP data when determining the location.

Also provided is another exemplary method for providing position assistance data from a positioning server includes receiving a position assistance data request message from a mobile device and transmitting to the mobile device, in response to the position assistance data request message, VAP data including a list of unique identifiers. The VAP data indicates that the unique identifiers included on the list identify signals originating from the same physical AP. In a further example, provided is a non-transitory computer-readable medium, comprising processor-executable instructions stored thereon configured to cause a processor, such as a special-purpose processor, to execute at least a part of the method.

In a further example, provided is a positioning server. The positioning server includes a memory and a processor coupled to the memory. The processor is configured to receive a position assistance data request message from a mobile device and is configured to transmit to the mobile device, in response to the position assistance data request message, VAP data including a list of unique identifiers. The VAP data indicates that the unique identifiers included on the list identify signals originating from the same physical AP.

In a further example, provided is another positioning server. The positioning server includes means for receiving a position assistance data request message from a mobile device and means for transmitting to the mobile device, in response to the position assistance data request message, VAP data including a list of unique identifiers. The VAP data indicating that the unique identifiers included on the list identify signals originating from the same physical AP.

Also provided is an exemplary method for performing maintenance at a positioning server. The method includes retrieving assistance data (AD) including heatmaps from an AD database and reducing AD size by keeping only one heatmap per physical access point and removing redundant heatmaps that previously existed for individual virtual access points associated with the physical access point. In a further example, provided is a non-transitory computer-readable medium, comprising processor-executable instructions stored thereon configured to cause a processor, such as a special-purpose processor, to execute at least a part of the method.

In a further example, provided is a positioning server. The positioning server includes a memory and a processor coupled to the memory. The processor is configured to retrieve AD including heatmaps from an AD database and is configured to reduce AD size by keeping only one heatmap per physical access point and removing redundant heatmaps that previously existed for individual virtual access points associated with the physical access point.

In a further example, provided is another positioning server. The positioning server includes means for retrieving AD including heatmaps from an AD database and means for reducing AD size by keeping only one heatmap per access point and removing redundant heatmaps that previously existed for individual virtual access points associated with the physical access point.

The foregoing broadly outlines some of the features and technical advantages of the present teachings in order that the detailed description and drawings can be better understood. Additional features and advantages are also described in the detailed description. The conception and disclosed examples can be readily utilized as a basis for modifying or designing other structures for carrying out the same purposes of the present teachings. Such equivalent constructions do not depart from the technology of the teachings as set forth in the claims. The inventive features that are characteristic of the teachings, together with further objects and advantages, are better understood from the detailed description and the accompanying figures. Each of the figures is provided for the purpose of illustration and description only, and does not limit the present teachings.

BRIEF DESCRIPTION OF THE DRAWINGS

The inventive features that are characteristic of the teachings, together with further objects and advantages, are better understood from the detailed description and the accompanying figures. Each of the figures is provided for the purpose of illustration and description only, and do not limit the present teachings.

FIG. 3 depicts exemplary position assistance data.

Figure 1A:
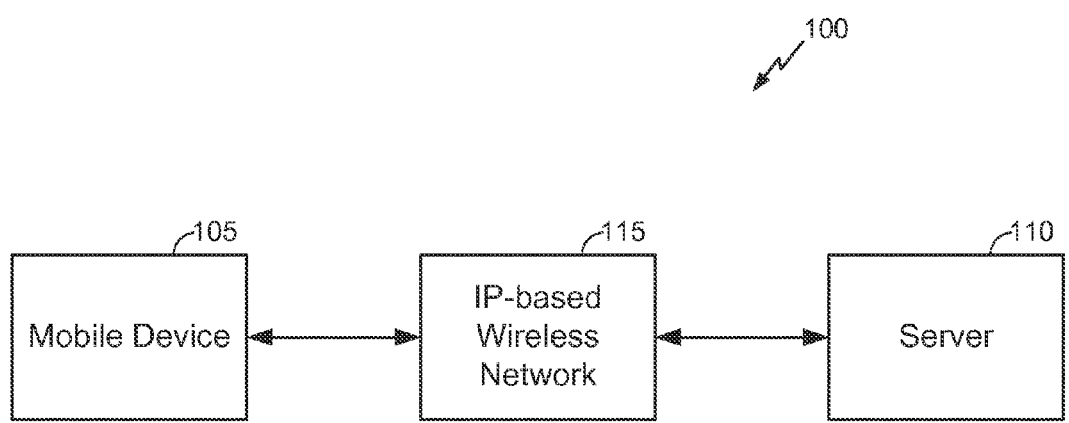
FIGS. 1A-C depict an exemplary network and constituent components.

In accordance with common practice, the features depicted by the drawings may not be drawn to scale. Accordingly, the dimensions of the depicted features may be arbitrarily expanded or reduced for clarity. In accordance with common practice, some of the drawings are simplified for clarity. Thus, the drawings may not depict all components of a particular apparatus or method. Further, like reference numerals denote like features throughout the specification and figures.

DETAILED DESCRIPTION

Introduction

Methods and apparatus that that deliver assistance data from a server to a device that identifies virtual access points are provided. The exemplary apparatuses and methods disclosed herein advantageously address the long-felt industry needs, as well as other previously unidentified needs, and mitigate shortcomings of the conventional methods and apparatus. For example, an advantage provided by the disclosed apparatuses and methods herein is an improvement in energy savings over conventional devices. Other advantages over conventional techniques include a reduced time to obtain a fix of a mobile device's position, less processor loading, and higher positioning accuracy Examples are disclosed in this application's text and drawings. Alternate examples can be devised without departing from the scope of the disclosure. Additionally, conventional elements of the current teachings may not be described in detail, or may be omitted, to avoid obscuring aspects of the current teachings.

As used herein, the term "exemplary" means "serving as an example, instance, or illustration." Any description described as "exemplary" is not necessarily to be construed as preferred or advantageous over other examples. Likewise, the term "examples" does not require that all examples include the discussed feature, advantage, or mode of operation. Use of the terms "in one example," "an example," "in one feature," and/or "a feature" in this specification does not necessarily refer to the same feature and/or example. Furthermore, a particular feature and/or structure can be combined with one or more other features and/or structures.

Moreover, at least a portion of the apparatus described hereby can be configured to perform at least a portion of a method described hereby.

It should be noted that the terms "connected," "coupled," or any variant thereof, mean any connection or coupling, either direct or indirect, between elements, and can encompass a presence of an intermediate element between two elements that are "connected" or "coupled" together via the intermediate element. Coupling and/or connection between the elements can be physical, logical, or a combination thereof. As employed herein, elements can be "connected" or "coupled" together, for example, by using one or more wires, cables, and/or printed electrical connections, as well as by using electromagnetic energy. The electromagnetic energy can have wavelengths in the radio frequency region, the microwave region and/or the optical (both visible and invisible) region. These are several non-limiting and non-exhaustive examples.

It should be understood that the term "signal" can include any signal such as a data signal, audio signal, video signal, multimedia signal, analog signal, and/or digital signal. Information and signals can be represented using any of a variety of different technologies and techniques. For example, data, an instruction, a process step, a process block, a command, information, a signal, a bit, and/or a symbol described in this description can be represented by a voltage, a current, an electromagnetic wave, a magnetic field and/or particle, an optical field and/or particle, and any combination thereof.

Any reference herein to an element using a designation such as "first," "second," and so forth does not limit the quantity and/or order of those elements. Rather, these designations are used as a convenient method of distinguishing between two or more elements and/or instances of an element. Thus, a reference to first and second elements does not mean that only two elements can be employed, or that the first element must necessarily precede the second element. Also, unless stated otherwise, a set of elements can comprise one or more elements. In addition, terminology of the form "at least one of: A, B, or C" used in the description or the claims can be interpreted as "A or B or C or any combination of these elements."

The terminology used herein is for the purpose of describing particular examples only and is not intended to be limiting. As used herein, the singular forms "a," "an," and "the" are intended to include the plural forms as well, unless the context clearly indicates otherwise. Further, the terms "comprises," "comprising," "includes," and "including," when used herein, specify a presence of stated features, integers, blocks, steps, operations, elements, and/or components, but do not preclude the presence and/or addition of one or more other features, integers, blocks, steps, operations, elements, components, and/or groups thereof.

The term "location" is used herein in a context of estimating a position of a mobile device. The term "location" is not to be considered an exact position. Therefore, a concept of a mobile terminal being "in" a location does not imply that the mobile device is exactly in one physical position or another, but rather refers to a vicinity or region that can vary in extent based on the implementation and the particular circumstances of the implementation.

In this description, certain terminology is used to describe certain features. The term "mobile device" can describe, and is not limited to, a mobile phone, a mobile communication device, a personal navigation device, a pager, a personal digital assistant, a personal information manager, a mobile hand-held computer, a computer (e.g., a tablet computer, a laptop computer, a wearable computer, a wireless device, a wireless modem, and/or other types of portable electronic devices typically carried by a person and/or having communication capabilities (e.g., wireless, cellular, infrared, short-range radio, etc.). Further, the terms "user equipment" (UE), "mobile terminal," "mobile device," and "wireless device," can be interchangeable.

Description of the Figures

FIG. 1A depicts an exemplary network 100 configured to provide server-assisted indoor positioning of a mobile device. A mobile device 105 is coupled to a server (e.g., a positioning server, an indoor positioning server, and/or the like) 110 via an internet-protocol (IP)-based wireless network 115.

Figure 1B:
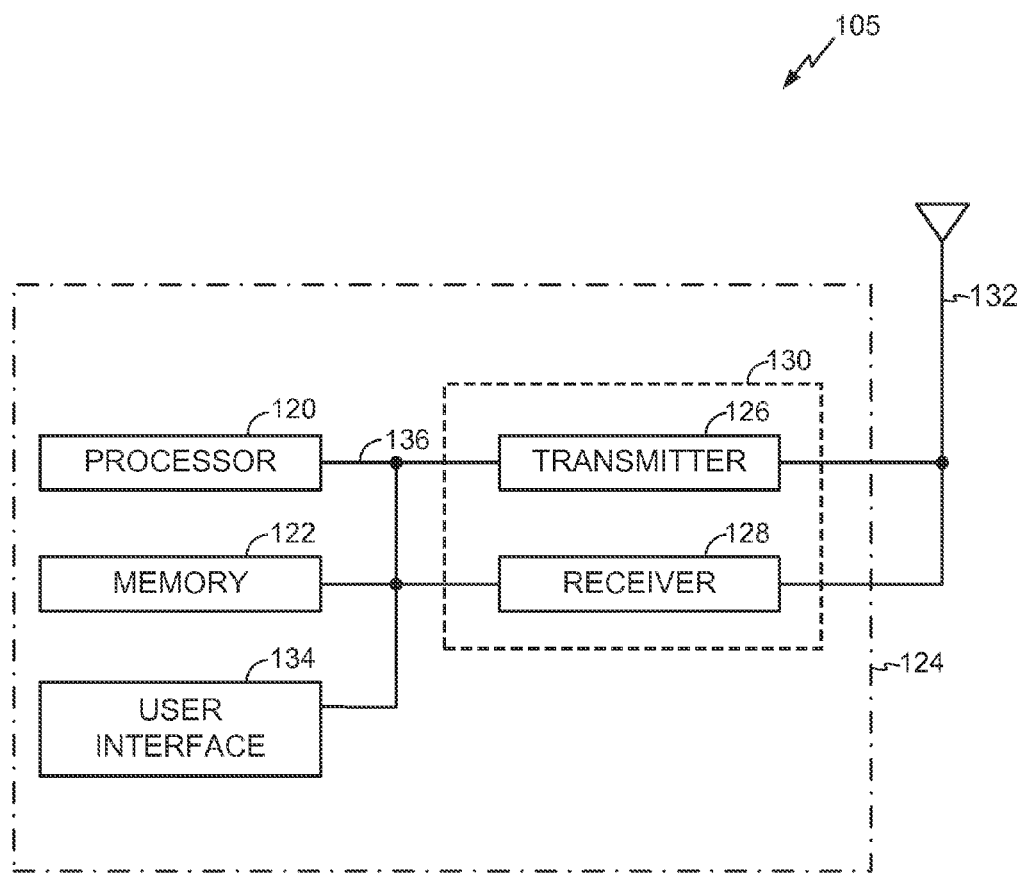

FIG. 1B depicts an exemplary mobile device 105 that can be employed within the network 100. The mobile device 105 is an example of a device that can be configured to implement at least a portion of the methods described herein. For example, the mobile device 105 can process position assistance data.

The mobile device 105 can include a processor 120 which is configured to control operation of the mobile device 105. A memory 122, which can include both read-only memory (ROM) and/or random access memory (RAM), can provide instructions and/or data to the processor 120. A portion of the memory 122 can also include non-volatile random access memory (NVRAM). The processor 120 typically performs logical and arithmetic operations based on program instructions stored within the memory 122. The instructions in the memory 122 can be executable by the processor 120 to implement at least a part of a method described herein.

The processor 120 can comprise or be a component of a processing system implemented with one or more processors. The one or more processors can be implemented with any combination of a general-purpose microprocessor, a microcontrollers, a digital signal processor (DSPs), a field programmable gate array (FPGA), a programmable logic devices (PLD), a controller, a state machine, gated logic, a discrete hardware component, a dedicated hardware finite state machine, and/or any other suitable entity that can perform a calculation and/or a manipulation of information.

The memory 122 can also include machine-readable media for storing processor-executable code. Software is construed broadly to mean any type of instructions, whether referred to as software, firmware, middleware, microcode, hardware description language, or otherwise. Instructions can include code (e.g., in source code format, binary code format, executable code format, or any other suitable format of code). The instructions, when executed by the processor 120, cause the processor 120 to perform at least a part of the functions described herein.

The mobile device 105 can also include a housing 124 that can include a transmitter 126 and a receiver 128 that are respectively configured to wirelessly transmit and wirelessly receive data to couple the mobile device 105 via a wireless link (e.g., with the IP-based wireless network 115) to obtain connectivity to the Internet and/or to other wide area networks. The transmitter 126 and the receiver 128 can be combined into a transceiver 130. An antenna 132 can be attached to the housing 124 and electrically coupled to the transceiver 130.

The mobile device 105 can further comprise a user interface 134 in some aspects. The user interface 134 can comprise a keypad, a microphone, a speaker, and/or a display. The user interface 134 can include any element or component that conveys information to a user of the mobile device 105 and/or receives input from the user.

The components of the mobile device 105 can be coupled together by a bus system 136. The bus system 136 can include a data bus, for example, as well as a power bus, a control signal bus, and/or a status signal bus in addition to the data bus. The components of the mobile device 105 can be coupled together to accept and/or provide inputs to each other using some other mechanism. Although a number of separate components are illustrated in FIG. 1B, those of skill in the art will recognize that one or more of the components can be combined or commonly implemented.

Figure 1C:
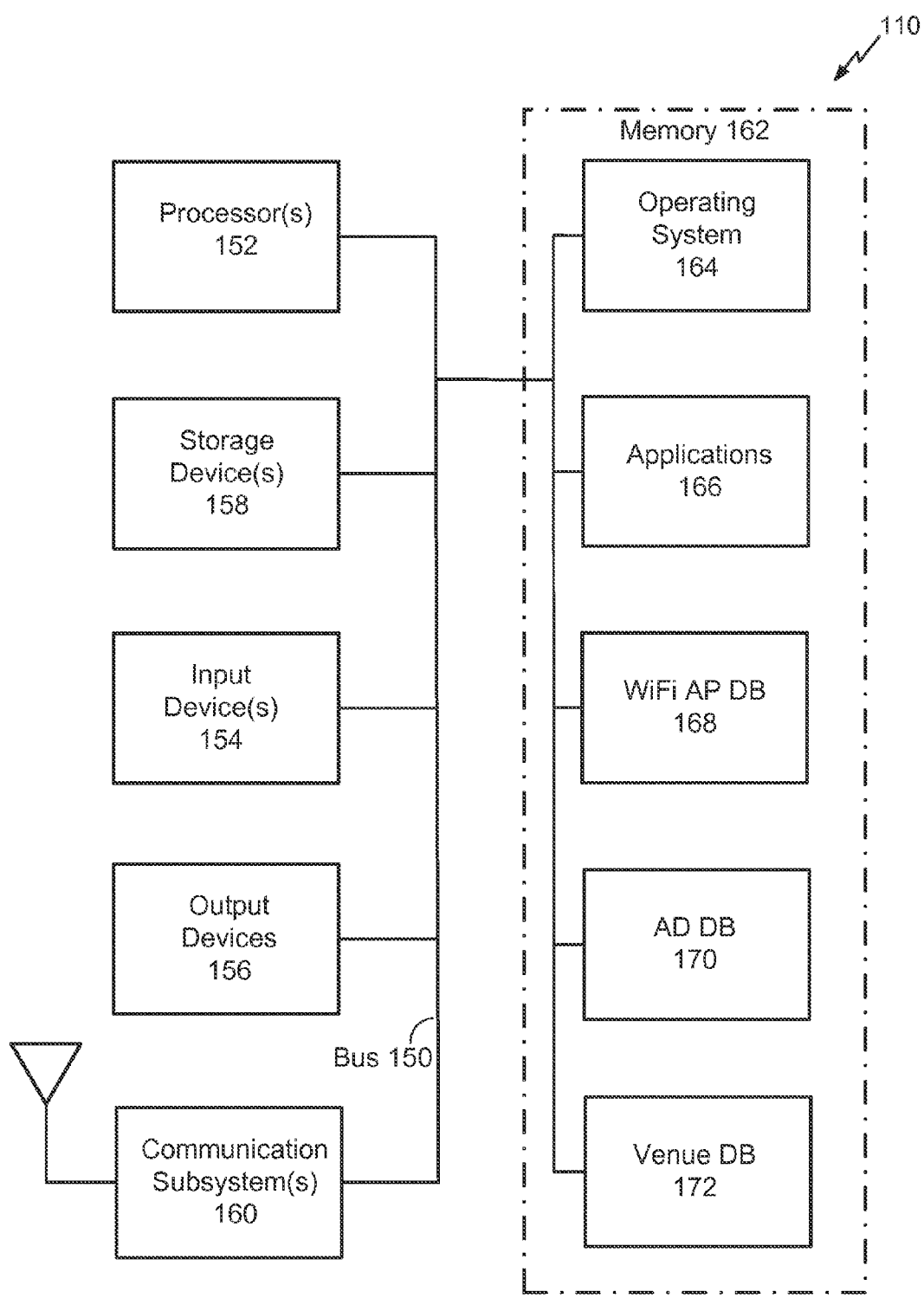

An example of the server 110 is depicted in FIG. 1C. The server 110 can be an indoor positioning server that is configured to provide position assistance data to a mobile device. The server 110 can include a memory coupled to a processor, such as a special-purpose processor, that is configured to perform at least a part of a method described hereby. The processor is coupled to the mobile device 105 via the internet-protocol (IP)-based wireless network 115. The server 110 can a part of a computing device, which can implement, perform, and/or execute any and/or all of the features, methods, and/or method steps described herein. FIG. 1C is meant only to provide a generalized depicting of components, any and/or all of which can be used as practicably appropriate. FIG. 1C therefore broadly depicts how individual system elements can be implemented.

The server 110 is depicted as comprising hardware elements that can be electrically coupled via a bus 150 (or can otherwise be in communication, as appropriate). The hardware elements can include one or more processors 152, including without limitation one or more general-purpose processors and/or one or more special-purpose processors (such as digital signal processing chips, graphics acceleration processors, and/or the like); one or more input devices 154, which can include without limitation a camera, a mouse, a keyboard and/or the like; and one or more output devices 156, which can include without limitation a display unit, a printer, and/or the like.

The server 110 can further include (and/or be in communication with) one or more non-transitory storage devices 158, which can comprise, without limitation, local and/or network accessible storage, and/or can include, without limitation, a disk drive, a drive array, an optical storage device, a solid-state storage device such as a random access memory ("RAM") and/or a read-only memory ("ROM"), which can be programmable, flash-updateable and/or the like. Such storage devices can be configured to implement any appropriate data storage, including without limitation, various file systems, database structures, and/or the like.

The server 110 can also include a communications subsystem 160, which can include without limitation a modem, a network card (wireless or wired), an infrared communication device, a wireless communication device and/or chipset (such as a Bluetooth® device, an 802.11 device, a WiFi device, a WiMax device, a cellular communication facility, etc.), and/or the like. The communications subsystem 160 can permit data to be exchanged with a network (such as the IP-based wireless network 115, for example), other computer systems, and/or other devices described herein. In an example, the server 110 can further comprise a non-transitory working memory 162, which can include a RAM and/or ROM device.

The server 110 also can comprise software elements, depicted as located (e.g., stored) within the working memory 162, including an operating system 164, device drivers, executable libraries, and/or other code, such as one or more application programs 166, which can comprise computer programs provided by various examples, and/or can be designed to implement methods, and/or configuration systems, provided by examples, as described herein. The memory 162 can also include a WiFi access point database 168 (WiFi AP DB), an assistance data database 170 (AD DB), and/or a venue database 172. The location of the WiFi access point database 168, the assistance data database 170 and/or the venue database 172 is discretionary: merely by way of example, a database can reside on a storage medium (e.g., the storage device(s) 158, the memory 162, and/or the like) that local to (and/or resident in) the server 110. Alternatively, a database can be remote from the server 110, so long as the database is in communication with (e.g., via IP-based wireless network 115) the server 110. In a particular set of examples, a database can reside in a storage-area network ("SAN"). The database can be controlled and/or maintained by a database server. Such databases can store information related to AP location and identification, securing information, and/or other such information that can enable at least a part of a method described herein. Merely by way of example, one or more procedures described with respect to the method(s) discussed herein, can be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of the computer programs, instructions, and/or code can be stored on a computer-readable storage medium, such as the storage device(s) 158 described above. In some examples, the storage medium can be incorporated within a computer system, such as the server 110. In other examples, the storage medium can be separate from a computer system (e.g., a removable medium, such as a compact disc), and/or provided in an installation package, such that the storage medium can be used to program, configure, and/or adapt a general purpose computer with the instructions/code stored thereon. The computer programs, instructions, and/or code can take a form of executable code that is executable by the server 110, and/or might take a form of source code and/or installable code, which, upon compilation and/or installation on the server 110 (e.g., using any of a variety of generally available compilers, installation programs, compression/decompression utilities, etc.) then takes a form of the executable code.

Substantial and practicable variations can be made in accordance with specific requirements. For example, customized hardware can also be used, and/or particular elements can be implemented in hardware, software (including portable software, such as applets, etc.), or both. Further, connection to other computing devices, such as network input/output devices, can be employed.

The internet-protocol (IP)-based wireless network 115 can be compatible with a WiFi standard, such as standard IEEE 802.11n and/or standard IEEE 802.11ac. In an example, the internet-protocol (IP)-based wireless network 115 includes a physical access point with which the mobile device 105 can be wirelessly coupled using multiple MAC addresses.

Figure 2:
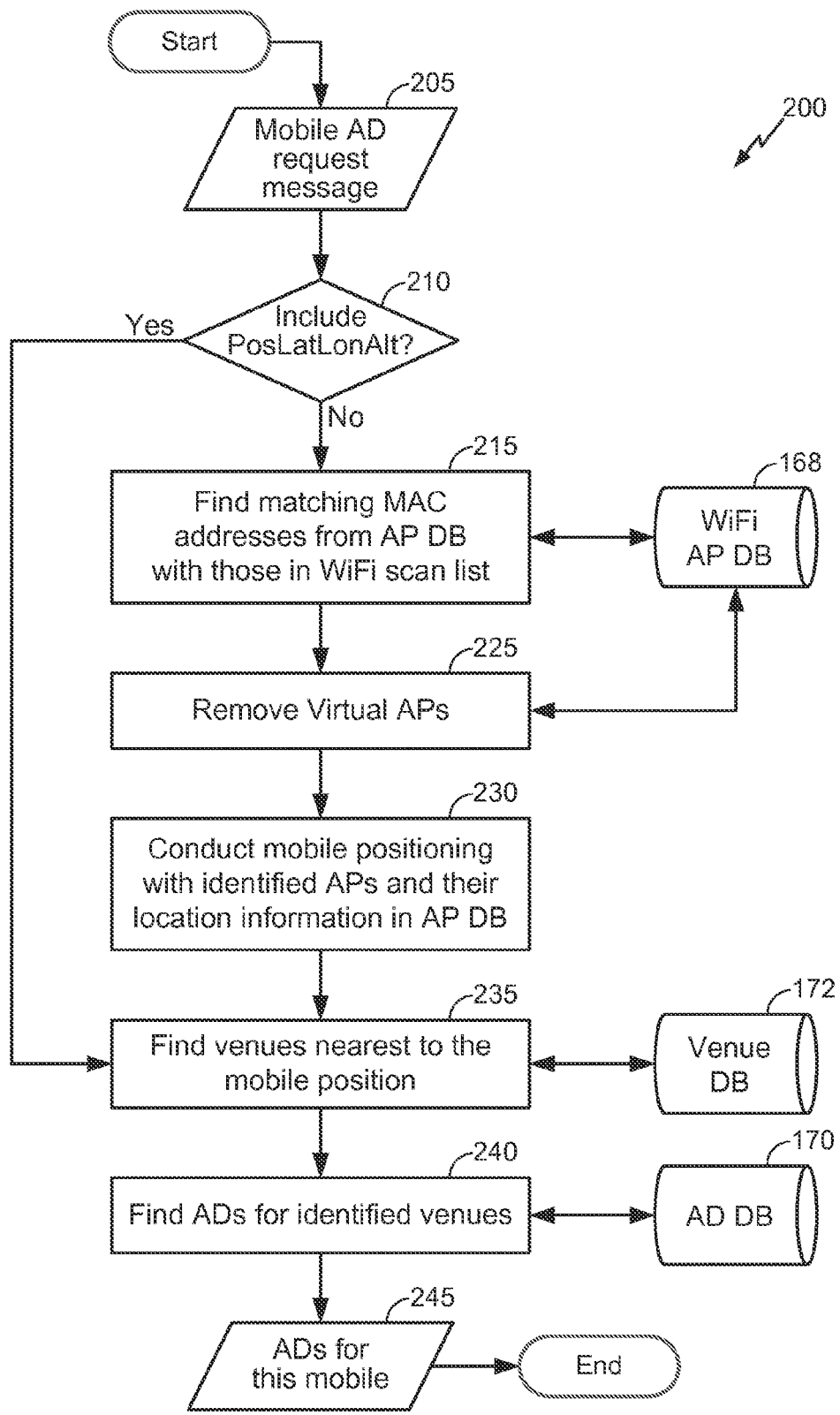
FIG. 2 depicts an exemplary method for providing indoor position assistance data from an indoor positioning server.

FIG. 2 depicts an exemplary method 200 for providing indoor position assistance data from an indoor positioning server, such as the server 110. At least a part of the method 200 can be performed by the apparatus described hereby, such as the constituent components of the network 100.

In block 205, a mobile device transmits a position assistance data (AD) request message to the indoor positioning server, which receives the request message. The position assistance data request message can include a coarse position in latitude, longitude, and altitude and/or a WiFi MAC address scan list.

In block 210, a determination is made as to whether the request message includes a coarse position (e.g., including latitude, longitude and/or altitude) of the mobile device. If yes, the method 200 proceeds to block 235, and if no, then the method 200 proceeds to block 215.

In block 215, MAC addresses that match both an access point database (AP DB) 220 and a WiFi scan list in the WiFi AP DB 168 (see FIG. 1C) are found.

In block 225, virtual access points are removed from the WiFi scan list in the WiFi AP DB 168 (see FIG. 1C).

In block 230, mobile positioning techniques are performed with identified access points using position information in the access point database 220.

In block 235, venues nearest to the mobile device's position are found using the venue database (venue DB) 172 (see FIG. 1C).

In block 240, assistance data for the identified venues are found using the AD DB 170 (see FIG. 1C).

In block 245, the assistance data and list of identified venues is sent to the mobile device, which then receives and uses the assistance data to identify a group of media access control (MAC) addresses for each access point and conduct scanning of only one MAC address per access point.

The assistance data can include the data 300 shown in FIG. 3. The shaded portions of FIG. 3 identify data pertaining to an exemplary virtual access point.

Figure 4:
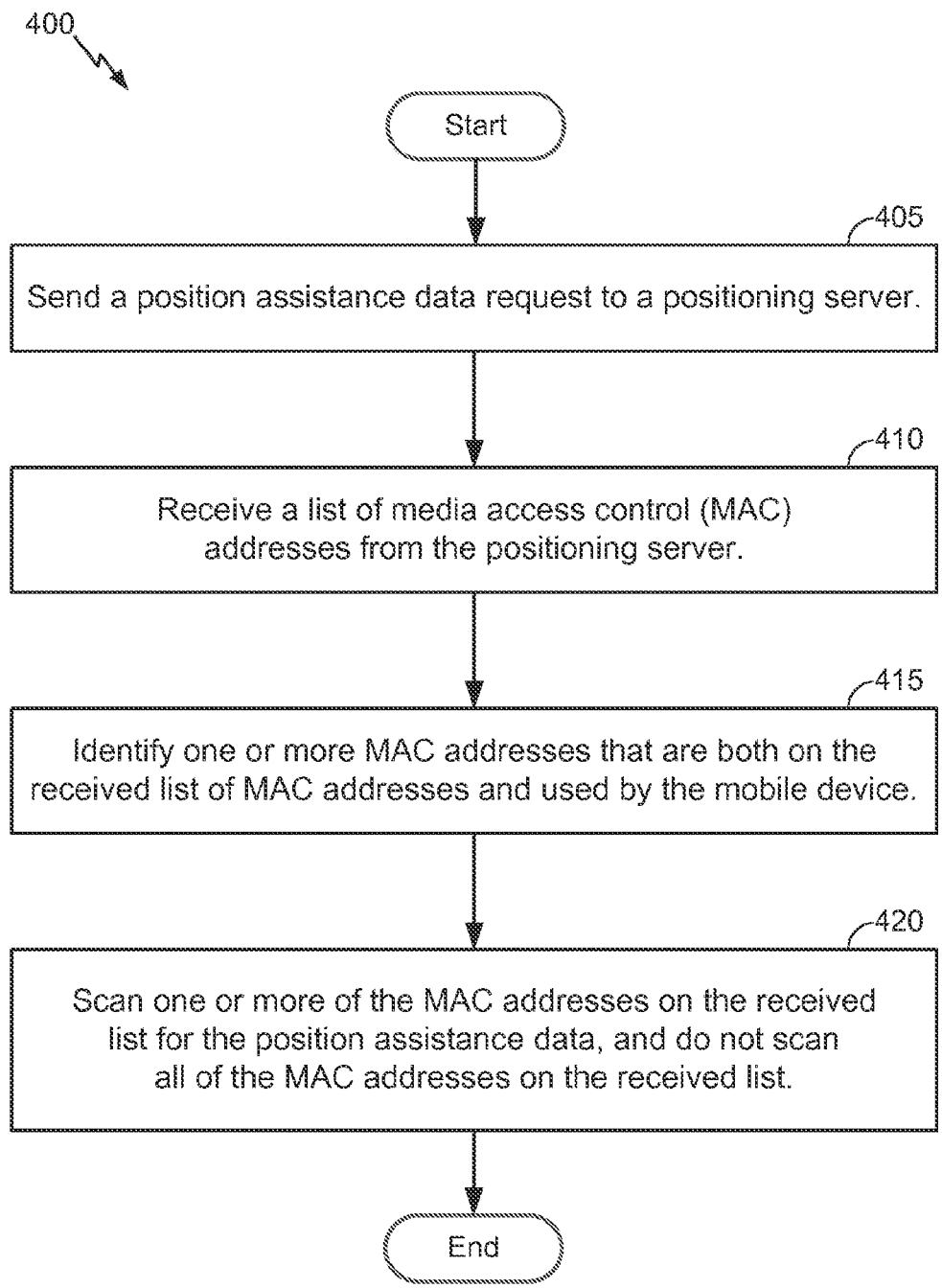
FIG. 4 depicts an exemplary method for processing position assistance data by a mobile device.

FIG. 4 depicts an exemplary method 400 for processing position assistance data by a mobile device, such as the mobile device 105. At least a part of the method 400 can be performed by the apparatus described hereby, such as the constituent components of the network 100.

In block 405, a position assistance data request is sent to a positioning server, such as the positioning server 110.

In block 410, a list of MAC addresses is received from the positioning server.

In block 415, one or more MAC addresses that are both on the received list of MAC addresses and used by the mobile device are identified. In one example, only one MAC address is identified.

Figure 5:
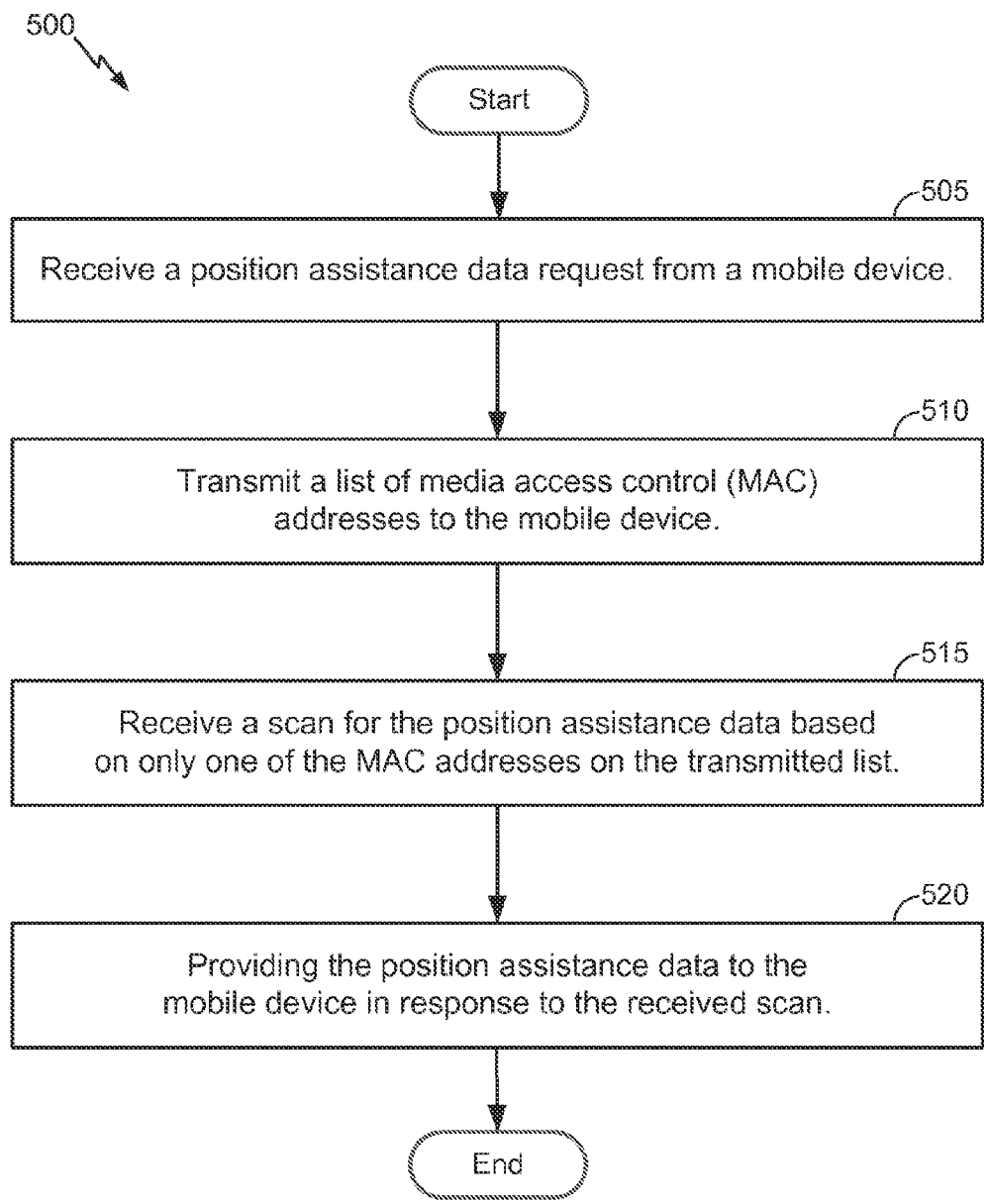
FIG. 5 depicts an exemplary method for providing position assistance data by a positioning server.

In block 420, the identified one or more MAC addresses on the received list for the position assistance data is scanned, but not all MAC addresses are scanned. That is, the number of one or more MAC addresses that are scanned is less than the total number of MAC addresses on the list received from the positioning server. In one example, only one MAC address is scanned, while none of the other MAC addresses on the received list are scanned. In an example, a base MAC address (i.e., the numerically lowest MAC address) on the received list is scanned. In a further example, the assistance data can include a priority MAC address, on the received list, that is scanned. The priority MAC address can be a MAC address that appears most often (e.g., the MAC address that is used most often by the mobile device) among the MAC addresses on the received list. Scanning one or more of the MAC addresses on the received list can including performing ranging with or measuring strength of a signal received from the APs associated with one or more of the MAC addresses on the list of unique identifiers, but not scanning all MAC addresses on the list of unique identifiers FIG. 5 depicts an exemplary method 500 for providing position assistance data from a positioning server, such as the server 110. At least a part of the method 500 can be performed by the apparatus described hereby, such as the constituent components of the network 100.

In block 505, a position assistance data request is received from a mobile device.

In block 510, a list of MAC addresses is transmitted to the mobile device.

In block 515, a scan for the position assistance data is received. The scan for the position assistance data is based on only one of the MAC addresses on the transmitted list of MAC addresses.

In block 520, the position assistance data is provided to the mobile device in response to the received scan.

Figure 6:
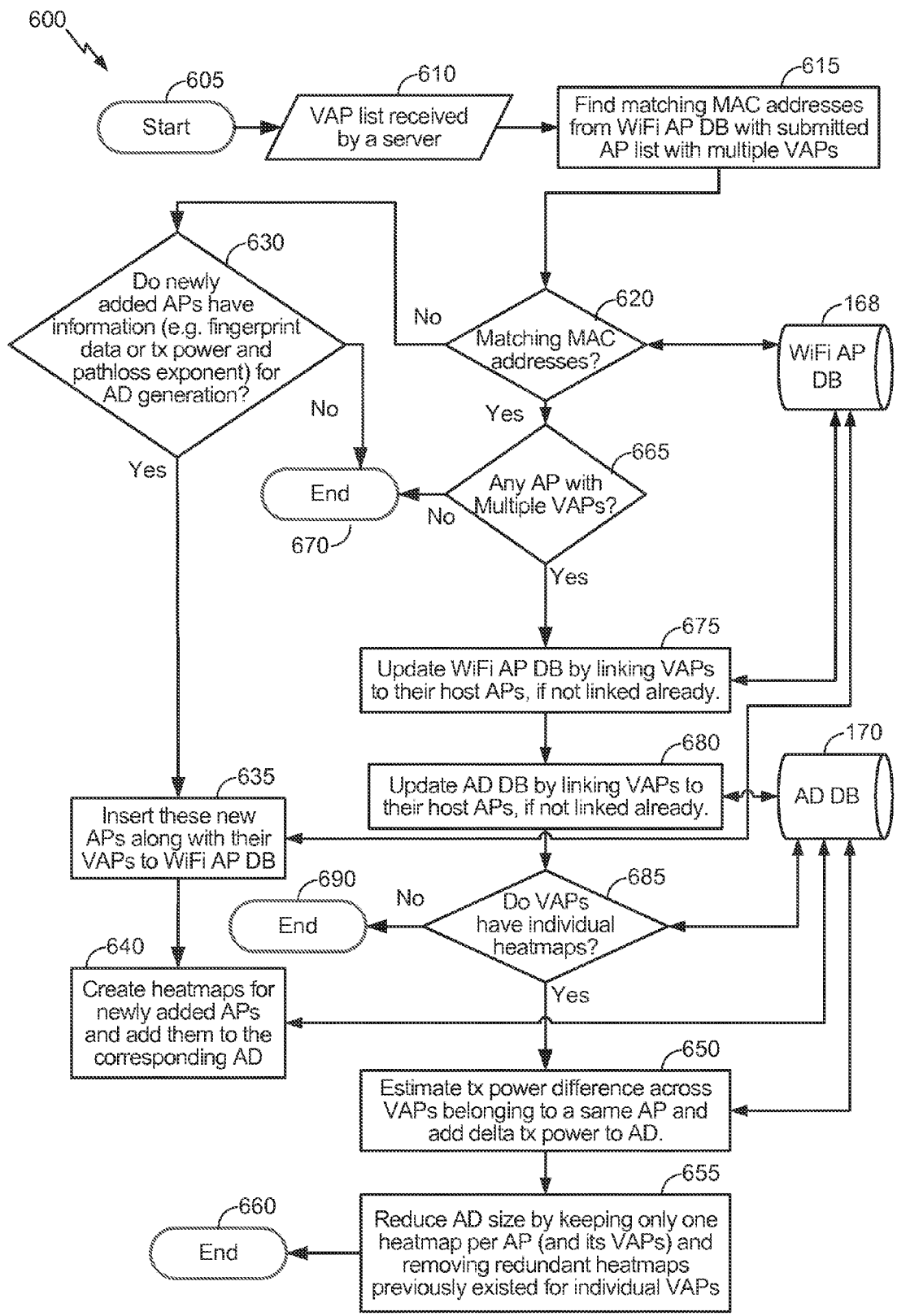
FIG. 6 depicts an exemplary method for performing registering and maintenance by an indoor positioning server.

FIG. 6 depicts an exemplary method 600 for performing registering and maintenance at an indoor positioning server, such as the server 110. At least a part of the method 600 can be performed by the apparatus described hereby, such as the constituent components of the network 100.

In block 605, the method 600 starts.

In block 610, a virtual access point (VAP) list is received by a server. The VAP list can be received by the server, for example, by a list submitted by email, an interface between a venue and the server, and/or a crowdsourcing-based approach that gathers data indicative of MAC addresses that map to a same physical server.

The method 600 then proceeds to block 615.

In block 615, a determination is made as to whether there are any MAC addresses from WiFi (AP) database (DB) that match a submitted access point (AP) list having multiple VAPs. The method 600 then proceeds to block 620.

In block 620, a determination is made as to whether there are matching MAC addresses. If there are no matching MAC addresses, then the method 600 proceeds to block 630. If there are matching MAC addresses, then the method 600 proceeds to block 665.

In block 630, a determination is made as to whether the newly added access points have associated additional information that can be used to generate assistance data (AD). Additional information can include, for example, fingerprint data, mobile device transmission power, pathloss exponent data, and/or the like. If so, proceed to block 635. If no, then there is no further processing for this AP list. The assistance data can include the data 300 shown in FIG. 3. The shaded portions of FIG. 3 identify data pertaining to an exemplary virtual access point.

In block 635, there are no matching MAC addresses, and data describing the new access point(s) and their respective VAP(s) are inserted into the WiFi AP DB 168 (see FIG. 1C). The method 600 then proceeds to block 640.

In block 640, a heatmap is created for the newly added access points. The data describing the heatmap is added to the AD DB 170 (see FIG. 1C) and the method 600 proceeds to block 650.

In block 650, a transmission power difference between VAPs belonging to the same access point is determined (e.g., by estimating) and data describing the transmission power difference is added to the AD DB 170 (see FIG. 1C). The method 600 then proceeds to block 655.

In block 655, the AD size is reduced by retaining only on heatmap per access point. A redundant heatmap for an individual VAP (e.g., an older heatmap) can be deleted.

In block 660, the method 600 ends.

In block 665, there are matching MAC addresses. A determination is made as to whether any of the access points have multiple virtual access points. If no, then the method 600 proceeds to end at block 670. If yes, then the method 600 proceeds to block 675.

In block 675, at least one access point has multiple virtual access points. The WiFi AP DB 168 (see FIG. 1C) is updated by linking the VAPs to their host access points, if not linked already. The method 600 then proceeds to block 680.

In block 665, if the VAPs are not linked to their host access points, then the AD DB 170 (see FIG. 1C) is updated by linking the VAPs to their host access points. The method 600 then proceeds to block 685.

In block 685, a determination is made as to whether the VAPs have individual heatmaps. If yes, then the method 600 proceeds to proceed to block 650. If no, then the method 600 proceeds to end 690.

Figure 7:
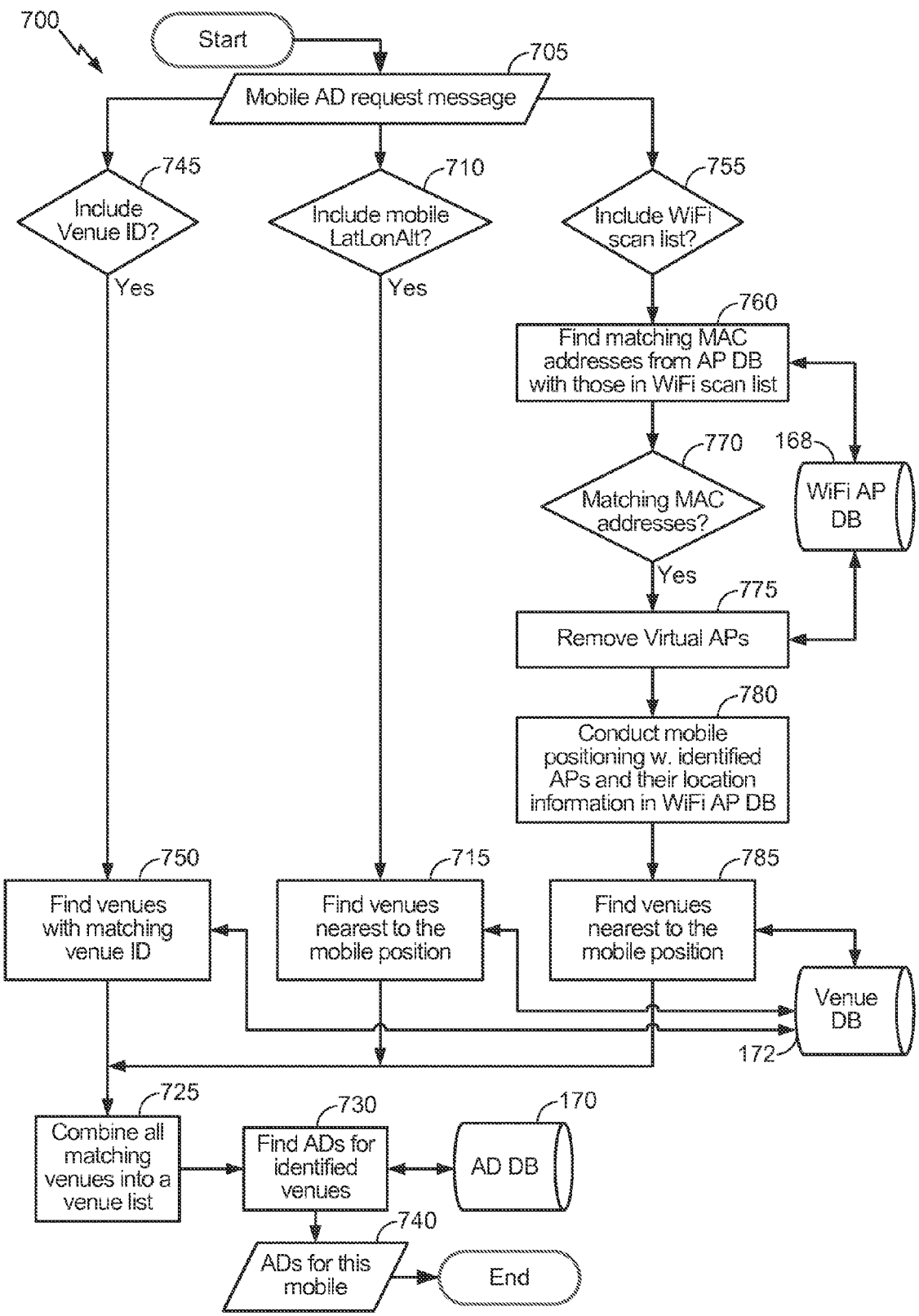
FIG. 7 depicts an exemplary method for providing indoor position assistance data from an indoor positioning server.

FIG. 7 depicts an exemplary method 700 for providing indoor position assistance data from an indoor positioning server, such as the server 110. At least a part of the method 700 can be performed by the apparatus described hereby, such as the constituent components of the network 100.

In block 705, a mobile device transmits a position assistance data (AD) request message to the indoor positioning server, which receives the request message. The position assistance data request message can include a coarse position in latitude, longitude, and altitude and/or a WiFi MAC address scan list. The method 700 then proceeds to blocks 710, 745, and/or 755. Blocks 710, 745, and/or 755 can be performed substantially simultaneously.

In block 710, a determination is made as to whether the request message includes a coarse position including latitude, longitude and altitude of the mobile device. If yes, the method 700 proceeds to block 715.

In block 715, venues nearest to the mobile position are found using the venue database 172 (see FIG. 1C). The process proceeds to block 725.

In block 725, all matching venues are combined into a list. Block 725 can be performed after all of blocks 710, 745, and/or 755, if performed, are complete.

In block 730, assistance data for identified venues is found from the assistance data database (AD DB) 170 (see FIG. 1C). The method 700 then proceeds to block 740. The assistance data can include the data 300 shown in FIG. 3. The shaded portions of FIG. 3 identify data pertaining to an exemplary virtual access point.

In block 740, assistance data for a specific mobile device is determined from the assistance data database 170. The assistance data and list of identified venues is sent to the mobile device, which then receives and uses the assistance data to identify a group of MAC addresses for each access point and conduct scanning of only one MAC address per access point.

In block 745, a determination is made as to whether the position AD request message includes a venue ID. If so, then the method 700 proceeds to block 760. If no, then there is no further action in this branch.

In block 750, venues that have a venue identification that matches the venue ID in the position AD request message are found using the venue database 172. The method 700 proceeds to block 725.

In block 755, a determination is made as to whether the position AD request message includes a WiFi scan list. If so, then proceed to block 760. If no, then there is no further action in this branch.

In block 760, MAC addresses in the WiFi access point data base 168 (see FIG. 1C) that match the WiFi scan list are searched for using the WiFi access point data base 168. The method 700 proceeds to block 770.

In block 770, a determination is made as to whether there are matching MAC addresses. If so, then the method 700 proceeds to block 775. If no, then there is no further action in this branch.

In block 775, virtual access points having matching MAC addresses are removed from the WiFi access point data base 168.

In block 780, mobile positioning is conducted with identified access points using respective access point identification from the WiFi access point data base 168.

In block 785, venues nearest to the mobile position are found using the venue database 172. The method 700 proceeds to block 725.

Figure 8:
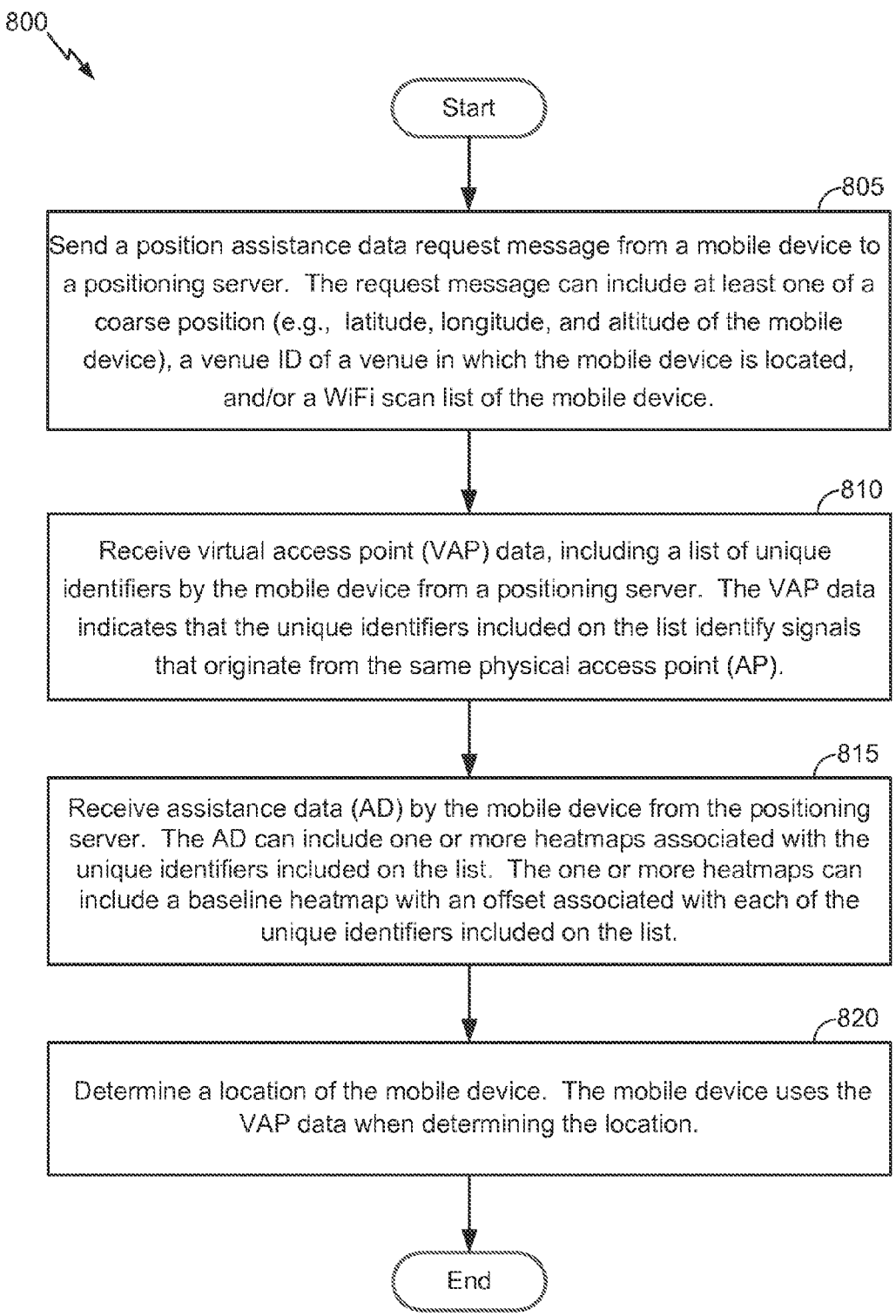
FIG. 8 depicts an exemplary method for processing position assistance data by a mobile device.

FIG. 8 depicts an exemplary method 800 for processing position assistance data by a mobile device, such as the mobile device 105. At least a part of the method 800 can be performed by the apparatus described hereby, such as the constituent components of the network 100.

In optional block 805, a position assistance data request message is sent from the mobile device to a positioning server. The request message can include at least one of a coarse position (e.g., latitude, longitude, and altitude of the mobile device), a venue ID of a venue in which the mobile device is located (if known), and/or a WiFi scan list of the mobile device. The coarse position of the mobile device can be determined from global positioning system data (e.g., GPS data and the like), a cellular base station ID, a radio locating device, and/or the like. If the venue ID is known by the mobile device, then the position assistance data request message can include a request for a VAP list for the known venue. The mobile device can also transmit a scan list of the APs to which the mobile device can couple. This scan list can be used by a positioning server to identify a location (e.g., a building, a floor in a building, a venue, and the like) of the mobile device.

The position assistance data request message is not required, and block 810 can be performed in an absence of a position assistance data request message. In an example, after sending a position assistance data request message the method 800 can skip to block 815.

In block 810, the VAP data, including a list of unique identifiers, is received by the mobile device from a positioning server. The VAP data indicates that the unique identifiers included on the list identify signals originating from the same physical AP. The unique identifiers can be MAC addresses. If the venue in which the mobile device is located is not known by the mobile device, the mobile device can determine a venue ID from the received VAP data. Determining, in this manner, the venue in which the mobile device is located is an example of venue disambiguation. Optionally, a list of MAC addresses is received by the mobile device from the positioning server. The mobile device identifies a MAC address that is both on the received list of MAC addresses and used by the mobile device. The mobile device then scans only one of the MAC addresses on the received list for the position assistance data, and does not scan any of the other MAC addresses on the received list.

Optionally, a MAC address that is both on the list of unique identifiers and observed by the mobile device is identified. Then, ranging is performed with a signal received from the AP associated with one or more of the MAC addresses on the list of unique identifiers, or a strength of the signal received from the AP associated with one or more of the MAC addresses on the list of unique identifiers is measured, but not all MAC addresses on the list of unique identifiers are scanned.

In block 815, AD is received by the mobile device from the positioning server. The AD can be provided in one of two levels of complexity. In a first level of AD that includes a relatively lower quantity of data, the AD includes a list of APs in a particular venue and/or a general vicinity of the mobile device. This first level of AD can include the VAP list. In a second level of AD that includes a relatively higher quantity of data, the AD includes one or more heatmaps for each of one or more physical APs. The VAP list can also be included in the second level of AD. The one or more heatmaps can be associated with the unique identifiers included on the VAP list, and in an example, can include a baseline heatmap with an offset associated with each of the unique identifiers included on the VAP list.

In block 820, the mobile device uses the VAP data to determine the location of the mobile device. In an example, the determining the location of the mobile device can include actively scanning a signal identified by a unique identifier included on the list and not actively scanning a different signal identified by a different unique identifier also included on the list. In another example, the determining the location of the mobile device can include computing a signal characteristic for the AP by averaging corresponding signal measurement values for more than one signal, where each signal is associated with a different unique identifier included on the list. The signal characteristic can include a signal strength (e.g., a received signal strength indication (RSSI)), a range (e.g., a round-trip time (RTT), or a combination of both). The signal characteristic can be measured and/or computed from one or more measurements. In another example, the determining the location of the mobile device can include passively scanning all of the AP beacons the mobile device detects, noting which APs the mobile device is detecting, and determining that the mobile device is in an area associated with a specific location context identifier (LCI) based on the APs the mobile device detects. In an example, a single floor of a building can have multiple LCIs, but if a floor is small in area, the floor can be associated with a single LCI. In other examples an LCI can be a wing of a mall, a specific terminal of an airport (versus other terminals of the airport), etc. The received AD can be for only a specific LCI, and not for an entire venue. A venue can have multiple LCIs. In another example, the determining the location of the mobile device can include venue disambiguation (e.g., LCI disambiguation). The venue disambiguation can be based on a number of APs meeting a criteria, and not on a number of unique identifiers.

Figure 9:
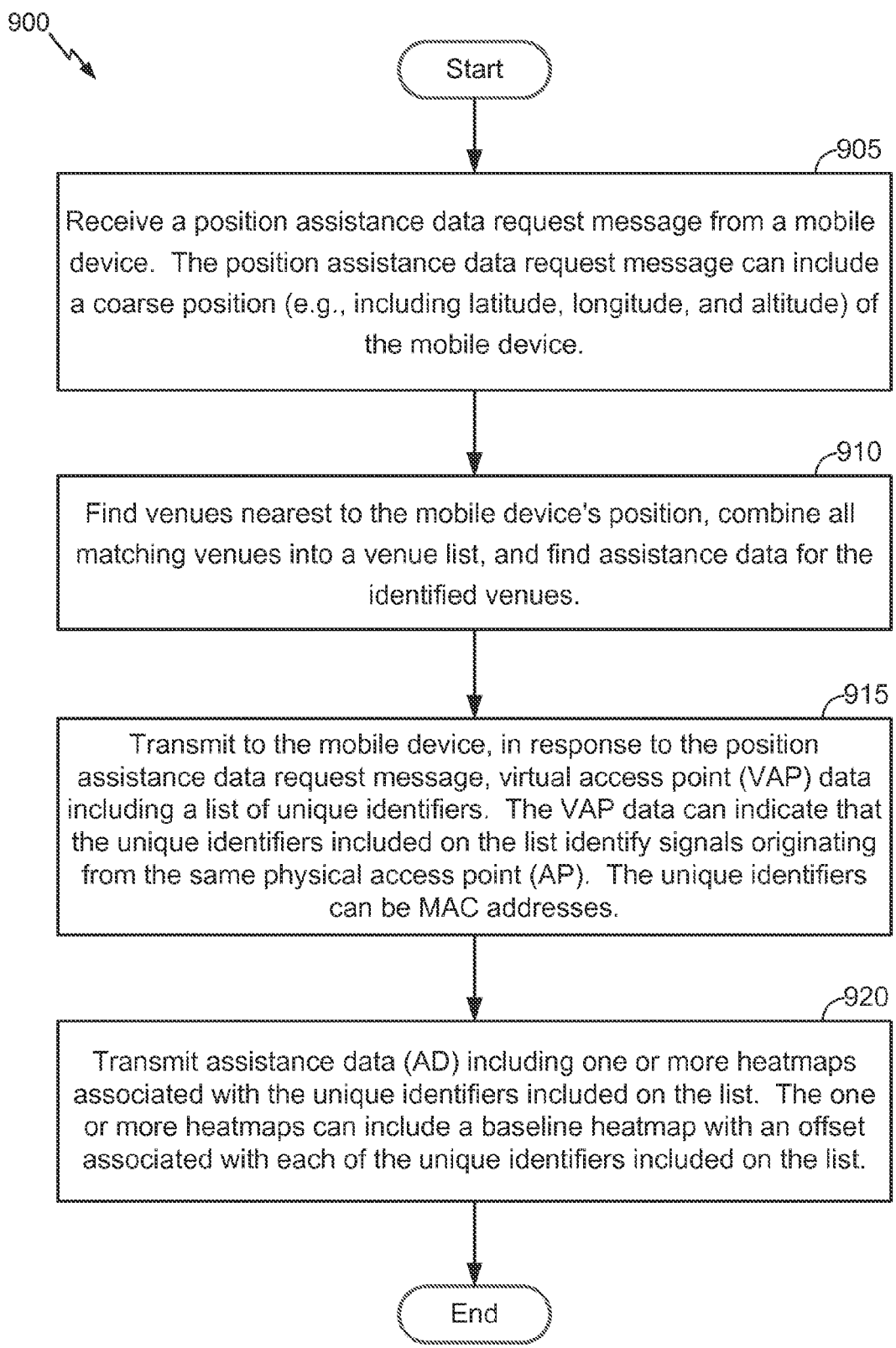
FIG. 9 depicts an exemplary method for providing position assistance data from a positioning server.

FIG. 9 depicts an exemplary method 900 for providing position assistance data from a positioning server, such as the server 110. At least a part of the method 900 can be performed by the apparatus described hereby, such as the constituent components of the network 100.

In block 905, receive a position assistance data request message from a mobile device. The position assistance data request message can include a coarse position (e.g., including latitude, longitude, and altitude) of the mobile device. Optionally, the position assistance data request message can include a venue ID of a venue in which the mobile device is located, and finding venues with a matching venue ID can be found, all matching venues are combined into a venue list, and assistance data can be found for the identified venues. In another example, the position assistance data request message can include a WiFi scan list of the mobile device, and matching MAC addresses from an access point database is found, duplicate VAP data is removed, venues nearest to the mobile device are found, all matching venues are combined into a venue list, and assistance data for the identified venues is found.

In optional block 910, find venues nearest to the mobile device's position, combine all matching venues into a venue list, and find assistance data for the identified venues.

In block 915, transmit to the mobile device, in response to the position assistance data request message, VAP data including a list of unique identifiers. The VAP data can indicate that the unique identifiers included on the list identify signals originating from the same physical AP. The unique identifiers can be MAC addresses.

In optional block 920, transmit AD including one or more heatmaps associated with the unique identifiers included on the list. The one or more heatmaps can include a baseline heatmap with an offset associated with each of the unique identifiers included on the list.

Figure 10:
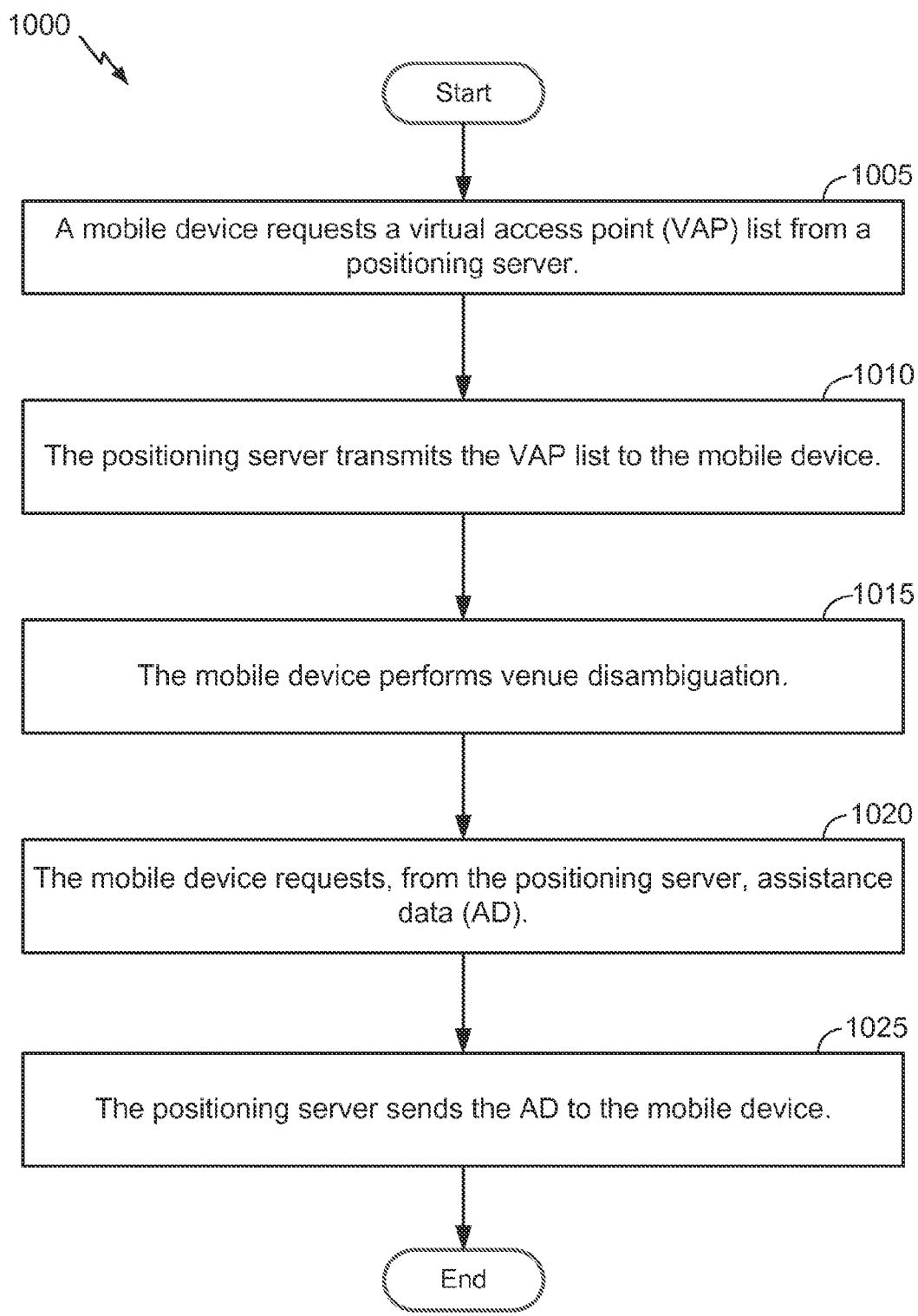
FIG. 10 depicts an exemplary method for position assistance data communication between a mobile device and a positioning server.

FIG. 10 depicts an exemplary method 1000 for position assistance data communication between a mobile device, such as the mobile device 105 and a positioning server, such as the server 110.

In block 1005, a mobile device requests a VAP list from a positioning server. The request message can include at least one of a coarse position (e.g., latitude, longitude, and altitude of the mobile device), a venue ID of a venue in which the mobile device is located (if known), and/or a WiFi scan list of the mobile device. The coarse position of the mobile device can be determined from global positioning system data (e.g., GPS data and the like), a cellular base station ID, a radio locating device, and/or the like. If the venue ID is known by the mobile device, then the position assistance data request message can include a request for a VAP list for the known venue. The mobile device can also transmit a scan list of the APs which the mobile device can currently identify. This scan list can be used by a positioning server to identify a location (e.g., a building, a floor in a building, a venue, and the like) of the mobile device. As an alternative to performing block 1020 after block 1010, the mobile device can perform block 1020 substantially simultaneously with performing block 1005.

In block 1010, the positioning server transmits the VAP list to the mobile device. The VAP data, including a list of unique identifiers, is received by the mobile device from a positioning server. The VAP data indicates that the unique identifiers included on the list identify signals originating from the same physical AP. The unique identifiers can be MAC addresses.

In optional block 1015, the mobile device performs venue disambiguation. If the venue in which the mobile device is located is not known by the mobile device, the mobile device can determine a venue ID from the received VAP data. In situations where the mobile device already has a venue ID, as discussed above with reference to block 1005, as well as in other situations, block 1015 may not be performed.

In block 1020, the mobile device requests, from the positioning server, AD.

In block 1025, the positioning server sends the AD to the mobile device. The VAP list can include MAC addresses and/or heatmap data that does not include redundant heatmap data. The AD can be provided in one of two levels of complexity. In a first level of AD that includes a relatively lower quantity of data, the AD includes a list of APs in a particular venue and/or a general vicinity of the mobile device. This first level of AD can include the VAP list. In a second level of AD that includes a relatively higher quantity of data, the AD includes one or more heatmaps for each of one or more physical APs. The VAP list can also be included in the second level of AD. The one or more heatmaps can be associated with the unique identifiers included on the VAP list, and in an example, can include a baseline heatmap with an offset associated with each of the unique identifiers included on the VAP list.

The various illustrative logical blocks, modules, circuits, and algorithm blocks described in connection with the examples disclosed herein can be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans can implement the described functionality in varying ways for each particular application, but such implementation decisions should not be interpreted as causing a departure from the scope of the present disclosure.

At least a portion of the methods, sequences, and/or algorithms described in connection with the examples disclosed herein can be embodied directly in hardware, in software executed by a processor, or in a combination of the two. In an example, a processor includes multiple discrete hardware components. A software module can reside in random-access memory (RAM), flash memory, read-only memory (ROM), erasable programmable read only memory (EPROM) memory, electrically erasable programmable read only memory (EEPROM) memory, registers, hard disk, a removable disk, a compact disc read-only memory (CD-ROM), and/or any other form of storage medium known in the art. An exemplary storage medium (e.g., a memory) can be coupled to the processor such that the processor can read information from, and write information to, the storage medium. In an alternative, the storage medium can be integral with the processor.

Further, many examples are described in terms of sequences of actions to be performed by, for example, elements of a computing device. The actions described herein can be performed by a specific circuit (e.g., an application specific integrated circuit (ASIC)), by program instructions being executed by one or more processors, or by a combination of both. Additionally, a sequence of actions described herein can be considered to be embodied entirely within any form of computer readable storage medium having stored therein a corresponding set of computer instructions that upon execution would cause an associated processor (such as a special-purpose processor) to perform at least a portion of a function described herein. Thus, the various aspects of the disclosure can be embodied in a number of different forms, all of which have been contemplated to be within the scope of the claimed subject matter. In addition, for each of the examples described herein, a corresponding circuit of any such examples can be described herein as, for example, "logic configured to" perform a described action.

An example can include a computer readable media embodying a method described herein. Accordingly, any means for performing the functions described herein can be included in practicable examples.

The disclosed devices and methods can be designed and can be configured into a computer-executable file that is in a Graphic Database System Two (GDSII) compatible format, an Open Artwork System Interchange Standard (OASIS) compatible format, and/or a GERBER (e.g., RS-274D, RS-274X, etc.) compatible format, which are stored on a non-transitory (i.e., a non-transient) computer-readable media. The file can be provided to a fabrication handler who fabricates with a lithographic device, based on the file, an integrated device. In an example, the integrated device is on a semiconductor wafer. The semiconductor wafer can be cut into a semiconductor die and packaged into a semiconductor chip. The semiconductor chip can be employed in a device described herein (e.g., a mobile device).

Examples can include a non-transitory (i.e., a non-transient) machine-readable media and/or a non-transitory (i.e., a non-transient) computer-readable media embodying processor-executable instructions which, when executed by a processor (such as a special-purpose processor), transform a processor and any other cooperating devices into a machine (e.g., a special-purpose processor) configured to perform at least a part of a function described hereby and/or transform a processor and any other cooperating devices into at least a part of the apparatus described hereby.

Nothing stated or illustrated depicted in this application is intended to dedicate any component, block, step, feature, object, benefit, advantage, or equivalent to the public, regardless of whether the component, block, step, feature, object, benefit, advantage, or the equivalent is recited in the claims.

While this disclosure describes examples, it should be noted that various changes and modifications could be made herein without departing from the scope of the disclosure as defined by the appended claims.

What is claimed is:

1. A method for processing position assistance data by a mobile device, comprising:
    receiving virtual access point (VAP) data including a unique identifier for a physical access point (AP) and a list of unique identifiers for one or more virtual APs from a positioning server, the VAP data indicating that the unique identifiers for the one or more virtual APs included on the list identify signals originating from the physical AP, wherein the VAP data comprises:
        a field representative of an AP base media access control (MAC) address of the physical AP; and
        an other field representative of an AP MAC address corresponding to a respective virtual AP belonging to the physical AP, wherein the other field repeats a number of times corresponding to a number of virtual APs that belong to the physical AP; and
    determining a location of the mobile device, wherein the mobile device uses the VAP data when determining the location.

2. The method of claim 1, further comprising sending a position assistance data request message to a positioning server.

3. The method of claim 2, wherein the request message includes a coarse position including latitude, longitude, and altitude of the mobile device.

4. The method of claim 2, wherein the request message includes a venue ID of a venue in which the mobile device is located.

5. The method of claim 2, wherein the request message includes a WiFi scan list of the mobile device.

6. The method of claim 1, wherein the unique identifiers are media access control (MAC) addresses.

7. The method of claim 1, wherein the determining the location of the mobile device includes actively scanning a signal identified by a unique identifier included on the list and not actively scanning a different signal identified by a different unique identifier also included on the list.

8. The method of claim 1, wherein the determining the location of the mobile device includes computing a signal characteristic for the AP by averaging corresponding signal measurement values for more than one signal, each signal associated with a different unique identifier included on the list.

9. The method of claim 8, wherein the signal characteristic includes signal strength, range, or a combination of both.

10. The method of claim 1, further comprising receiving assistance data (AD) including one or more heatmaps associated with the unique identifiers included on the list.

11. The method of claim 10, wherein the one or more heatmaps include a baseline heatmap with an offset associated with each of the unique identifiers included on the list.

12. The method of claim 1, wherein the determining the location of the mobile device includes venue disambiguation.

13. The method of claim 12, further comprising:
passively scanning AP beacons the mobile device detects; and
determining, based on the AP beacons the mobile device detects, that the mobile device is in an area associated with a specific location context identifier.

14. The method of claim 12, wherein the venue disambiguation is based on a number of APs meeting a criteria, and not on a number of unique identifiers.

15. The method of claim 1, further comprising:
receiving a list of media access control (MAC) addresses from the positioning server;
identifying a MAC address that is both on the received list of MAC addresses and used by the mobile device; and
scanning only one of the MAC addresses on the received list for the position assistance data, and not scanning any of the other MAC addresses on the received list.

16. The method of claim 1, further comprising:
identifying one or more media access control (MAC) addresses that are both on the list of unique identifiers and observed by the mobile device, wherein the unique identifiers in the list of unique identifiers are MAC addresses; and
performing ranging with or measuring strength of a signal received from the AP associated with the one or more of the MAC addresses on the list of unique identifiers, but not scanning all MAC addresses on the list of unique identifiers.

17. The method of claim 1, wherein the VAP data further comprises a NUM_MAC field indicating the number of virtual APs belonging to the physical AP.

18. A mobile device, comprising:
a memory; and
a processor coupled to the memory and configured to:
receive virtual access point (VAP) data including a unique identifier for a physical access point (AP) and a list of unique identifiers for one or more virtual APs from a positioning server, the VAP data indicating that the unique identifiers for the one or more virtual APs included on the list identify signals originating from the physical AP, wherein the VAP data comprises:
a field representative of an AP base media access control (MAC) address of the physical AP; and
an other field representative of an AP MAC address corresponding to a respective virtual AP belonging to the physical AP, wherein the other field repeats a number of times corresponding to a number of virtual APs that belong to the physical AP; and
determine a location of the mobile device, wherein the processor uses the VAP data when determining the location.

19. The mobile device of claim 18, wherein the processor is further configured to cause the mobile device to send a position assistance data request to a positioning server.

20. The mobile device of claim 19, wherein the request message includes a coarse position including latitude, longitude, and altitude of the mobile device.

21. The mobile device of claim 19, wherein the request message includes a venue ID of a venue in which the mobile device is located.

22. The mobile device of claim 19, wherein the request message includes a WiFi scan list of the mobile device.

23. The mobile device of claim 18, wherein the unique identifiers are media access control (MAC) addresses.

24. The mobile device of claim 18, wherein the processor configured to determine the location of the mobile device includes actively scanning a signal identified by a unique identifier included on the list and not actively scanning a different signal identified by a different unique identifier also included on the list.

25. The mobile device of claim 18, wherein the processor configured to determine the location of the mobile device includes computing a signal characteristic for the AP by averaging corresponding signal measurement values for more than one signal, each signal associated with a different unique identifier included on the list.

26. The mobile device of claim 25, wherein the signal characteristic includes signal strength, range, or a combination of both.

27. The mobile device of claim 18, wherein the processor is further configured to receive assistance data (AD) including one or more heatmaps associated with the unique identifiers included on the list.

28. The mobile device of claim 27, wherein the one or more heatmaps include a baseline heatmap with an offset associated with each of the unique identifiers included on the list.

29. The mobile device of claim 18, wherein the determining a location of the mobile device includes venue disambiguation.

30. The mobile device of claim 29, wherein the processor is further configured to:
cause the mobile device to passively scan AP beacons the mobile device detects; and
determine, based on the AP beacons the mobile device detects, that the mobile device is in an area associated with a specific location context identifier.

31. The mobile device of claim 29, wherein the venue disambiguation is based on a number of APs meeting a criteria, and not on a number of unique identifiers.

32. The mobile device of claim 18, wherein the processor is further configured to:
receive a list of media access control (MAC) addresses from the positioning server;
identify a MAC address that is both on the received list of MAC addresses and used by the mobile device; and
scan only one of the MAC addresses on the received list for position assistance data, and not scanning any of the other MAC addresses on the received list.

33. The mobile device of claim 18, wherein the processor is further configured to:
identify one or more media access control (MAC) addresses that are both on the list of unique identifiers and observed by the mobile device, wherein the unique identifiers in the list of unique identifiers are MAC addresses; and perform ranging with or measuring strength of a signal received from the AP associated with the one or more of the MAC addresses on the list of unique identifiers, but not scanning all of the MAC addresses on the list of unique identifiers.

34. The mobile device of claim 18, wherein the VAP data further comprises a NUM_MAC field indicating the number of virtual APs belonging to the physical AP.

35. A non-transitory computer-readable medium, comprising processor-executable instructions stored thereon to be retrieved and executed by one or more processors, the processor-executable instructions including instructions to:
receive virtual access point (VAP) data at a mobile device, the VAP data including a unique identifier for a physical access point (AP) and a list of unique identifiers or one or more virtual APs from a positioning server, the VAP data indicating that the unique identifiers for the one or more virtual APs included on the list identify signals originating from the physical AP, wherein the VAP data comprises:
a field representative of an AP base media access control (MAC) address of the physical AP; and
an other field representative of an AP MAC address corresponding to a respective virtual AP belonging to the physical AP, wherein the other field repeats a number of times corresponding to a number of virtual APs that belong to the physical AP; and
determine a location of the mobile device, wherein the mobile device uses the VAP data when determining the location.

36. The non-transitory computer-readable medium of claim 35, the processor-executable instructions further include instructions to send a position assistance data request to a positioning server.

37. The non-transitory computer-readable medium of claim 36, wherein the request message includes a coarse position including latitude, longitude, and altitude of the mobile device.

38. The non-transitory computer-readable medium of claim 36, wherein the request message includes a venue ID of a venue in which the mobile device is located.

39. The non-transitory computer-readable medium of claim 36, wherein the request message includes a WiFi scan list of the mobile device.

40. The non-transitory computer-readable medium of claim 35, wherein the unique identifiers are media access control (MAC) addresses.

41. The non-transitory computer-readable medium of claim 35, wherein the instructions to determine the location of the mobile device include instructions to actively scan a signal identified by a unique identifier included on the list without actively scanning a different signal identified by a different unique identifier also included on the list.

42. The non-transitory computer-readable medium of claim 35, wherein the instructions to determine the location of the mobile device include instructions to compute a signal characteristic for the AP by averaging corresponding signal measurement values for more than one signal, each signal associated with a different unique identifier included on the list.

43. The non-transitory computer-readable medium of claim 42, wherein the signal characteristic includes signal strength, range, or a combination of both.

44. The non-transitory computer-readable medium of claim 35, wherein the processor-executable instructions further include instructions to receive assistance data (AD) including one or more heatmaps associated with the unique identifiers included on the list.

45. The non-transitory computer-readable medium of claim 44, wherein the one or more heatmaps include a baseline heatmap with an offset associated with each of the unique identifiers included on the list.

46. The non-transitory computer-readable medium of claim 35, wherein the determining a location of the mobile device includes venue disambiguation.

47. The non-transitory computer-readable medium of claim 46, wherein the processor-executable instructions further include instructions to cause the one or more processors to:
passively scan AP beacons the mobile device detects; and
determine, based on the AP beacons the mobile device detects, that the mobile device is in an area associated with a specific location context identifier.

48. The non-transitory computer-readable medium of claim 46, wherein the venue disambiguation is based on a number of APs meeting a criteria, and not on a number of unique identifiers.

49. The non-transitory computer-readable medium of claim 35, wherein the processor-executable instructions further include instructions to:
receive a list of media access control (MAC) addresses from the positioning server;
identify a MAC address that is both on the received list of MAC addresses and used by the mobile device; and
scan only one of the MAC addresses on the received list for position assistance data, and not scan any of the other MAC addresses on the received list.

50. The non-transitory computer-readable medium of claim 35, wherein the processor-executable instructions further include instructions to:
identify one or more media access control (MAC) addresses that are both on the list of unique identifiers and observed by the mobile device, wherein the unique identifiers in the list of unique identifiers are MAC addresses; and
perform ranging with or measuring strength of a signal received from the AP associated with the one or more of the MAC addresses on the list of unique identifiers, but not scanning all of the MAC addresses on the list of unique identifiers.

51. A mobile device configured to process position assistance data, comprising:
means for receiving virtual access point (VAP) data including a unique identifier for a physical access point (AP) and a list of unique identifiers for one or more virtual APs from a positioning server, the VAP data indicating that the unique identifiers for the one or more virtual APs included on the list identify signals originating from the physical AP, wherein the VAP data comprises:
a field representative of an AP base media access control (MAC) address of the physical AP; and
an other field representative of an AP MAC address corresponding to a respective virtual AP belonging to the physical AP, wherein the other field repeats a number of times corresponding to a number of virtual APs that belong to the physical AP; and
means for determining a location of the mobile device, wherein the mobile device uses the VAP data when determining the location.

52. The mobile device of claim 51, further comprising means for sending a position assistance data request to a positioning server.

53. The mobile device of claim 52, wherein the request message includes a coarse position including latitude, longitude, and altitude of the mobile device.

54. The mobile device of claim 52, wherein the request message includes a venue ID of a venue in which the mobile device is located.

55. The mobile device of claim 52, wherein the request message includes a WiFi scan list of the mobile device.

56. The mobile device of claim 51, wherein the unique identifiers are media access control (MAC) addresses.

57. The mobile device of claim 51, wherein the means for determining the location of the mobile device includes means for actively scanning a signal identified by a unique identifier included on the list and not actively scanning a different signal identified by a different unique identifier also included on the list.

58. The mobile device of claim 51, wherein the means for determining the location of the mobile device includes means for computing a signal characteristic for the AP by averaging corresponding signal measurement values for more than one signal, each signal associated with a different unique identifier included on the list.

59. The mobile device of claim 58, wherein the signal characteristic includes signal strength, range, or a combination of both.

60. The mobile device of claim 51, further comprising means for receiving assistance data (AD) including one or more heatmaps associated with the unique identifiers included on the list.

61. The mobile device of claim 60, wherein the one or more heatmaps include a baseline heatmap with an offset associated with each of the unique identifiers included on the list.

62. The mobile device of claim 51, wherein the means for determining the location of the mobile device includes means for venue disambiguation.

63. The mobile device of claim 62, further comprising:
  means for passively scanning AP beacons the mobile device detects; and
  means for determining, based on the AP beacons the mobile device detects, that the mobile device is in an area associated with a specific location context identifier.

64. The mobile device of claim 62, wherein the venue disambiguation is based on a number of APs meeting a criteria, and not on a number of unique identifiers.

65. The mobile device of claim 51, further comprising:
  means for receiving a list of media access control (MAC) addresses from the positioning server;
  means for identifying a MAC address that is both on the received list of MAC addresses and used by the mobile device; and
  means for scanning only one of the MAC addresses on the received list for the position assistance data, and not scanning any of the other MAC addresses on the received list.

66. The mobile device of claim 51, further comprising:
  means for identifying one or more media access control (MAC) addresses that are both on the list of unique identifiers and observed by the mobile device, wherein the unique identifiers in the list of unique identifiers are MAC addresses; and
  means for performing ranging with or measuring strength of a signal received from the AP associated with the one or more of the MAC addresses on the list of unique identifiers, but not scanning all of the MAC addresses on the list of unique identifiers.

67. A method for providing position assistance data from a positioning server, comprising:
  receiving a position assistance data request message from a mobile device; and transmitting to the mobile device, in response to the position assistance data request message, virtual access point (VAP) data including a unique identifier for a physical access point (AP) and a list of unique identifiers for one or more virtual APs, the VAP data indicating that the unique identifiers for the one or more virtual APs included on the list identify signals originating from the physical AP, wherein the VAP data comprises:
    a field representative of an AP base media access control (MAC) address of the physical AP; and
    an other field representative of an AP MAC address corresponding to a respective virtual AP belonging to the physical AP, wherein the other field repeats a number of times corresponding to a number of virtual APs that belong to the physical AP.

68. The method of claim 67, wherein the position assistance data request message includes a coarse position including latitude, longitude, and altitude of the mobile device, and further comprising finding venues nearest to the mobile device's position, combining all matching venues into a venue list, and finding assistance data for the identified venues.

69. The method of claim 67, wherein the position assistance data request message includes a venue ID of a venue in which the mobile device is located, and further comprising finding venues with a matching venue ID, combining all matching venues into a venue list, and finding assistance data for the identified venues.

70. The method of claim 67, wherein the position assistance data request message includes a WiFi scan list of the mobile device, and the method further comprising finding matching media access control (MAC) addresses from an access point database, removing duplicate VAP data, finding venues nearest to the mobile device, combining all matching venues into a venue list, and finding assistance data for the identified venues.

71. The method of claim 67, wherein the unique identifiers are media access control (MAC) addresses.

72. The method of claim 67, further comprising transmitting assistance data (AD) including one or more heatmaps associated with the unique identifiers included on the list.

73. The method of claim 72, wherein the one or more heatmaps include a baseline heatmap with an offset associated with each of the unique identifiers included on the list.

74. The method of claim 67, wherein the VAP data further comprises a NUM_MAC field indicating the number of virtual APs belonging to the physical AP.

75. A positioning server, comprising:
  a memory; and
  a processor coupled to the memory and configured to:
    receive a position assistance data request message from a mobile device; and
    transmit to the mobile device, in response to the position assistance data request message, virtual access point (VAP) data including a unique identifier for a physical access point (AP) and a list of unique identifiers for one or more virtual APs, the VAP data indicating that the unique identifiers for the one or more virtual APs included on the list identify signals originating from the physical AP, wherein the VAP data comprises:

a field representative of an AP base media access control (MAC) address of the physical AP; and
an other field representative of an AP MAC address corresponding to a respective virtual AP belonging to the physical AP, wherein the other field repeats a number of times corresponding to a number of virtual APs that belong to the physical AP.

76. The positioning server of claim 75, wherein the position assistance data request message includes a coarse position including latitude, longitude, and altitude of the mobile device, and the processor is further configured to find venues nearest to the mobile device's position, combine all matching venues into a venue list, and find assistance data for the identified venues.

77. The positioning server of claim 75, wherein the position assistance data request message includes a venue ID of a venue in which the mobile device is located, and the processor is further configured to find venues with a matching venue ID, combine all matching venues into a venue list, and find assistance data for the identified venues.

78. The positioning server of claim 75, wherein the position assistance data request message includes a WiFi scan list of the mobile device, and the processor is further configured to find matching media access control (MAC) addresses from an access point database, remove duplicate VAP data, find venues nearest to the mobile device, combine all matching venues into a venue list, and find assistance data for the identified venues.

79. The positioning server of claim 75, wherein the unique identifiers are media access control (MAC) addresses.

80. The positioning server of claim 75, wherein the processor is further configured to transmit assistance data (AD) including one or more heatmaps associated with the unique identifiers included on the list.

81. The positioning server of claim 80, wherein the one or more heatmaps include a baseline heatmap with an offset associated with each of the unique identifiers included on the list.

82. The positioning server of claim 75, wherein the VAP data further comprises a NUM_MAC field indicating the number of virtual APs belonging to the physical AP.

83. A non-transitory computer-readable medium, comprising processor-executable instructions stored thereon to be retrieved and executed by one or more processors, the processor-executable instructions including instructions to:
receive a position assistance data request message from a mobile device; and transmit to the mobile device, in response to the position assistance data request message, virtual access point (VAP) data including a unique identifier for a physical access point (AP) and a list of unique identifiers for one or more virtual APs, the VAP data indicating that the unique identifiers for the one or more virtual APs included on the list identify signals originating from the physical AP, wherein the VAP data comprises:
a field representative of an AP base media access control (MAC) address of the physical AP; and
an other field representative of an AP MAC address corresponding to a respective virtual AP belonging to the physical AP, wherein the other field repeats a number of times corresponding to a number of virtual APs that belong to the physical AP.

84. The non-transitory computer-readable medium of claim 83, wherein the position assistance data request message includes a coarse position including latitude, longitude, and altitude of the mobile device, and the processor-executable instructions include instructions to find venues nearest to the mobile device's position, combine all matching venues into a venue list, and find assistance data for the identified venues.

85. The non-transitory computer-readable medium of claim 83, wherein the position assistance data request message includes a venue ID of a venue in which the mobile device is located, and the processor-executable instructions include instructions to find venues with a matching venue ID, combine all matching venues into a venue list, and find assistance data for the identified venues.

86. The non-transitory computer-readable medium of claim 83, wherein the position assistance data request message includes a WiFi scan list of the mobile device, and the processor-executable instructions include instructions to find matching media access control (MAC) addresses from an access point database, remove duplicate VAP data, find venues nearest to the mobile device, combine all matching venues into a venue list, and find assistance data for the identified venues.

87. The non-transitory computer-readable medium of claim 83, wherein the unique identifiers are media access control (MAC) addresses.

88. The non-transitory computer-readable medium of claim 83, wherein the processor-executable instructions further include instructions to cause the one or more processors to transmit assistance data (AD) including one or more heatmaps associated with the unique identifiers included on the list.

89. The non-transitory computer-readable medium of claim 88, wherein the one or more heatmaps include a baseline heatmap with an offset associated with each of the unique identifiers included on the list.

90. A positioning server, comprising:
means for receiving a position assistance data request message from a mobile device; and means for transmitting to the mobile device, in response to the position assistance data request message, virtual access point (VAP) data including a unique identifier for a physical access point (AP) and a list of unique identifiers for one or more virtual APs, the VAP data indicating that the unique identifiers for the one or more virtual APs included on the list identify signals originating from the physical AP, wherein the VAP data comprises:
a field representative of an AP base media access control (MAC) address of the physical AP; and
an other field representative of an AP MAC address corresponding to a respective virtual AP belonging to the physical AP, wherein the other field repeats a number of times corresponding to a number of virtual APs that belong to the physical AP.

91. The positioning server of claim 90, wherein the position assistance data request message includes a coarse position including latitude, longitude, and altitude of the mobile device, and further comprising means for finding venues nearest to the mobile device's position, means for combining all matching venues into a venue list, and means for finding assistance data for the identified venues.

92. The positioning server of claim 90, wherein the position assistance data request message includes a venue ID of a venue in which the mobile device is located, and further comprising means for finding venues with a matching venue ID, means for combining all matching venues into a venue list, and means for finding assistance data for the identified venues.

93. The positioning server of claim 90, wherein the position assistance data request message includes a WiFi scan list of the mobile device, and further comprising means for finding matching media access control (MAC) addresses from an access point database, means for removing duplicate VAP data, finding venues nearest to the mobile device, means for combining all matching venues into a venue list, and means for finding assistance data for the identified venues.

94. The positioning server of claim 90, wherein the unique identifiers are media access control (MAC) addresses.

95. The positioning server of claim 90, further comprising means for transmitting assistance data including one or more heatmaps associated with the unique identifiers included on the list.

96. The positioning server of claim 95, wherein the one or more heatmaps include a baseline heatmap with an offset associated with each of the unique identifiers included on the list.

97. A method for performing maintenance at a positioning server, comprising:
retrieving assistance data (AD) including heatmaps from an AD database;
reducing AD size by keeping only one heatmap per physical access point and removing redundant heatmaps that previously existed for individual virtual access points associated with the physical access point;
determining if the virtual access points have individual heatmaps; and
estimating a transmit power difference across virtual access points belonging to the same physical access point and adding data describing the transmit power difference data to the AD database.

98. A method for performing maintenance at a positioning server, comprising:
retrieving assistance data (AD) including heatmaps from an AD database;
reducing AD size by keeping only one heatmap per physical access point and removing redundant heatmaps that previously existed for individual virtual access points associated with the physical access point;
storing new access point data in a WiFi access point database, if a virtual access point list received by a server does not have media access control (MAC) addresses that match those stored in the WiFi access point database and has information for AD generation;
creating a heatmap for the newly stored access point data; and
storing the heatmap into the AD database.

99. A positioning server, comprising:
a memory; and
a processor coupled to the memory and configured to:
retrieve assistance data (AD) including heatmaps from an AD database;
reduce AD size by keeping only one heatmap per physical access point and removing redundant heatmaps that previously existed for individual virtual access points associated with the physical access point;
determine if the virtual access points have individual heatmaps; and
estimate a transmit power difference across virtual access points belonging to the same physical access point and adding data describing the transmit power difference data to the AD database.

100. A positioning server, comprising:
a memory; and
a processor coupled to the memory and configured to:
retrieve assistance data (AD) including heatmaps from an AD database;
reduce AD size by keeping only one heatmap per physical access point and removing redundant heatmaps that previously existed for individual virtual access points associated with the physical access point;
store new access point data in a WiFi access point database, if a virtual access point list received by a server does not have media access control (MAC) addresses that match those stored in the WiFi access point database and has information for AD generation;
create a heatmap for the new access point data; and
store the heatmap into the AD database.

101. A non-transitory computer-readable medium, comprising processor-executable instructions stored thereon to be retrieved and executed by one or more processors, the processor-executable instructions including instructions to:
retrieve assistance data (AD) including heatmaps from an AD database;
reduce AD size by keeping only one heatmap per physical access point and removing redundant heatmaps that previously existed for individual virtual access points associated with the physical access point;
determine if the virtual access points have individual heatmaps; and
estimate a transmit power difference across virtual access points belonging to the same physical access point and adding data describing the transmit power difference data to the AD database.

102. A non-transitory computer-readable medium, comprising processor-executable instructions stored thereon to be retrieved and executed by one or more processors, the processor-executable instructions including instructions to:
retrieve assistance data (AD) including heatmaps from an AD database;
reduce AD size by keeping only one heatmap per physical access point and removing redundant heatmaps that previously existed for individual virtual access points associated with the physical access point;
store new access point data in a WiFi access point database, if a virtual access point list received by a server does not have media access control (MAC) addresses that match those stored in the WiFi access point database and has information for AD generation;
create a heatmap for the newly stored access point data; and
store the heatmap into the AD database.

103. A positioning server, comprising:
means for retrieving assistance data (AD) including heatmaps from an AD database;
means for reducing AD size by keeping only one heatmap per physical access point and removing redundant heatmaps that previously existed for individual virtual access points associated with the physical access point;
means for determining if the virtual access points have individual heatmaps; and
means for estimating a transmit power difference across virtual access points belonging to the same physical access point and adding data describing the transmit power difference data to the AD database.

104. A positioning server, comprising:
means for retrieving assistance data (AD) including heatmaps from an AD database;
means for reducing AD size by keeping only one heatmap per physical access point and removing redundant heatmaps that previously existed for individual virtual access points associated with the physical access point;

means for storing new access point data in a WiFi access point database, if a virtual access point list received by a server does not have media access control (MAC) addresses that match those stored in the WiFi access point database and has information for AD generation;
means for creating a heatmap for the newly stored access point data; and
means for storing the heatmap into the AD database.

\* \* \* \* \*